L. F. DIETER.
DISHED CAR WHEEL OR SIMILAR BODY.
APPLICATION FILED NOV. 9, 1917.
1,377,618.
Patented May 10, 1921.
8 SHEETS—SHEET 1.
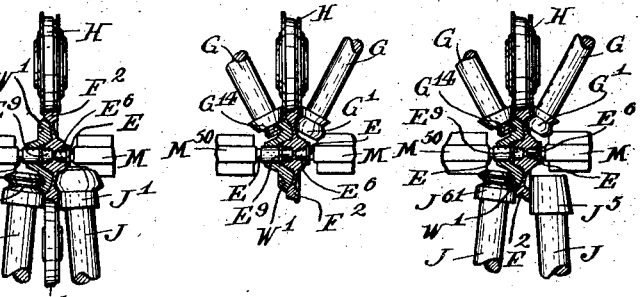
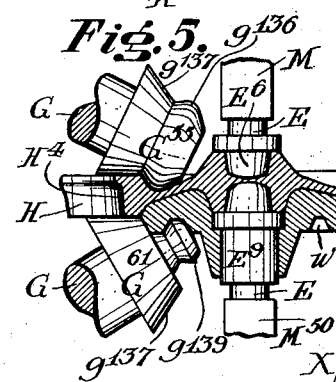
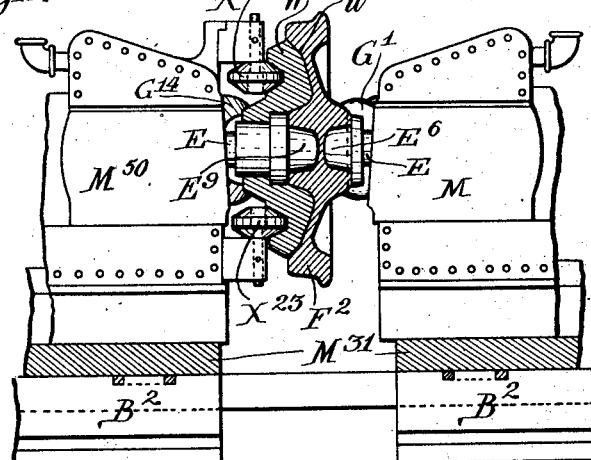
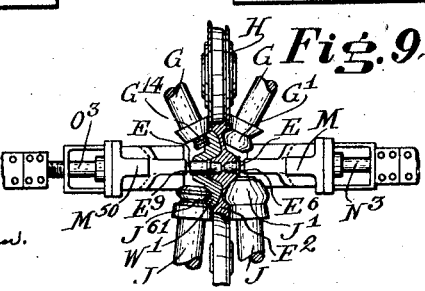
Witnesses.
Waldemar N. Dieter.
Francis J. Houlihan.
Inventor.
Louis F. Dieter.

L. F. DIETER.
DISHED CAR WHEEL OR SIMILAR BODY.
APPLICATION FILED NOV. 9, 1917.

1,377,618.

Patented May 10, 1921.

Witnesses.
Waldemar N. Dieter.
Francis T. Houlihan.

Inventor:
Louis F. Dieter

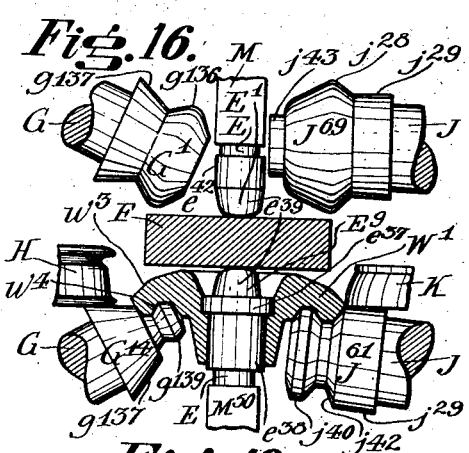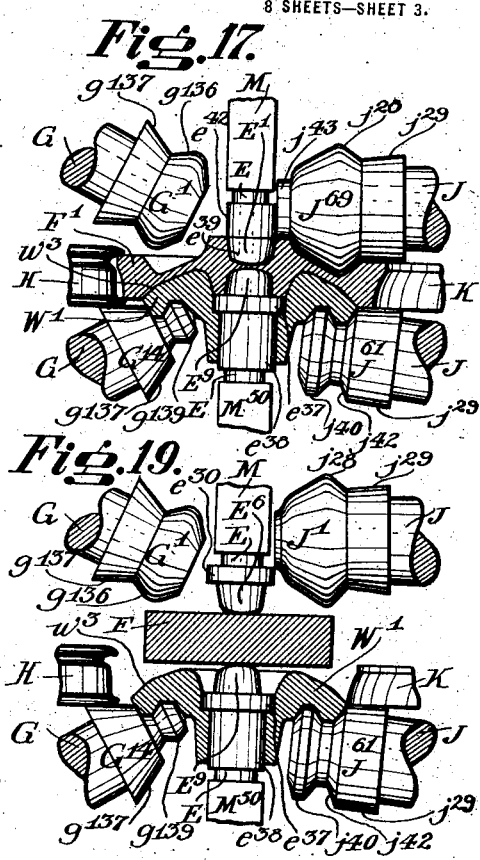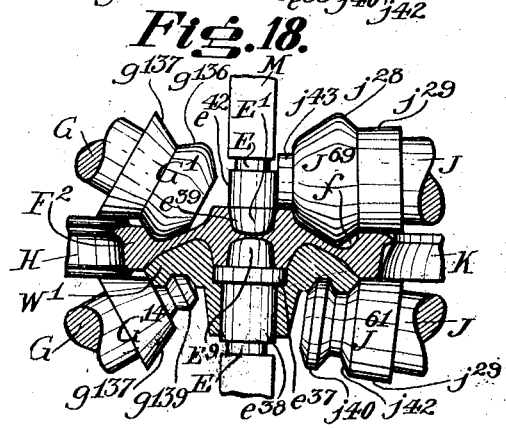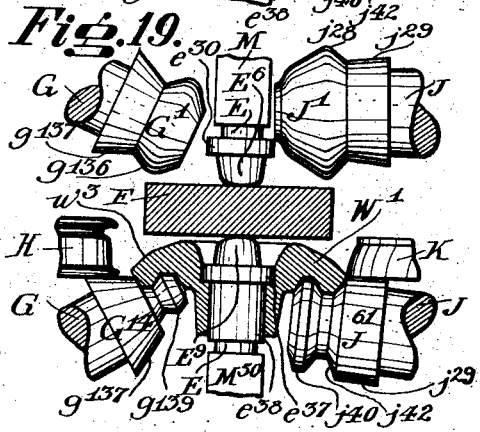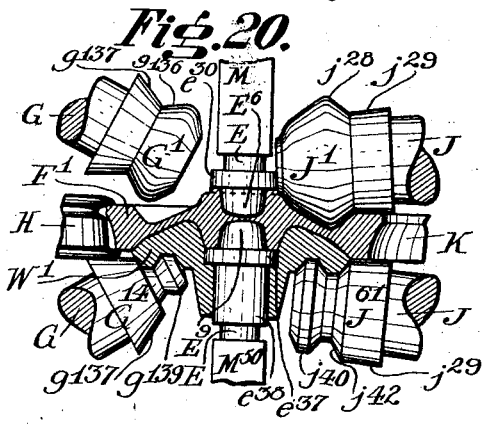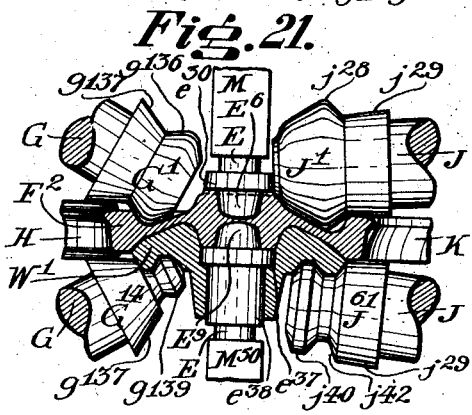

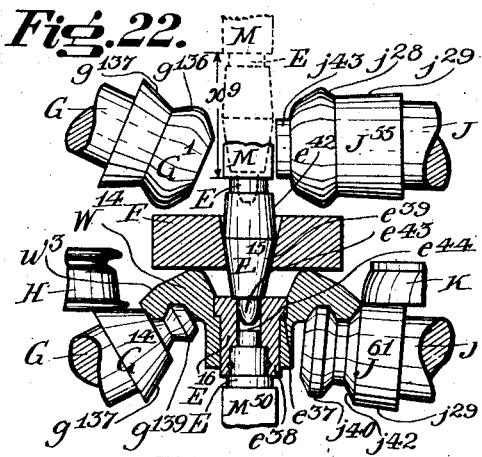

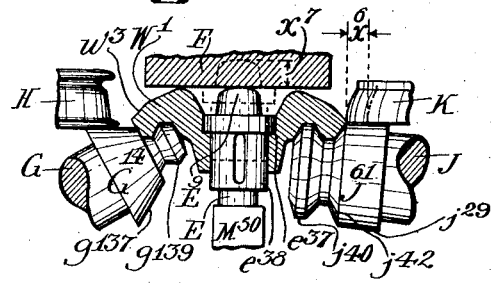
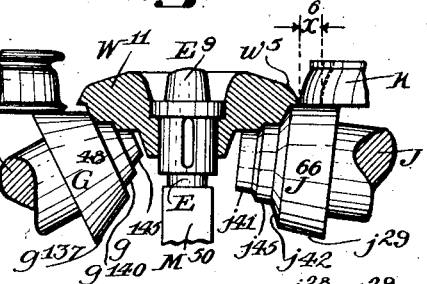
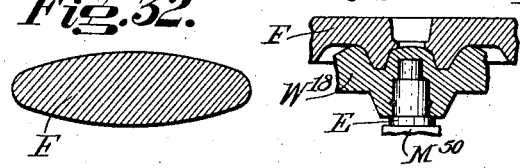
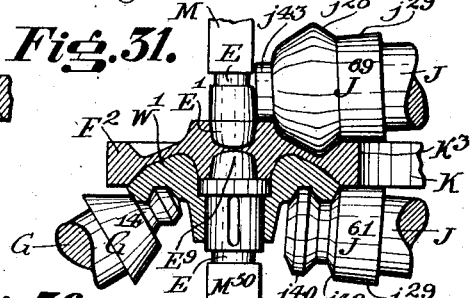
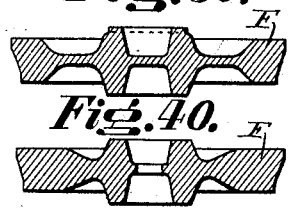
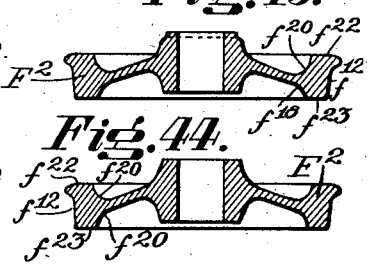
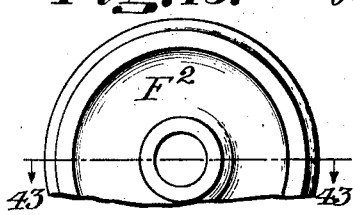

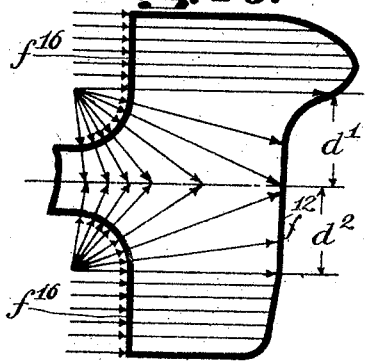
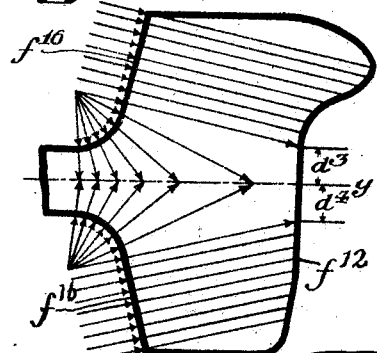
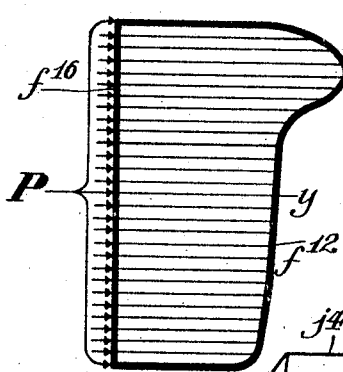
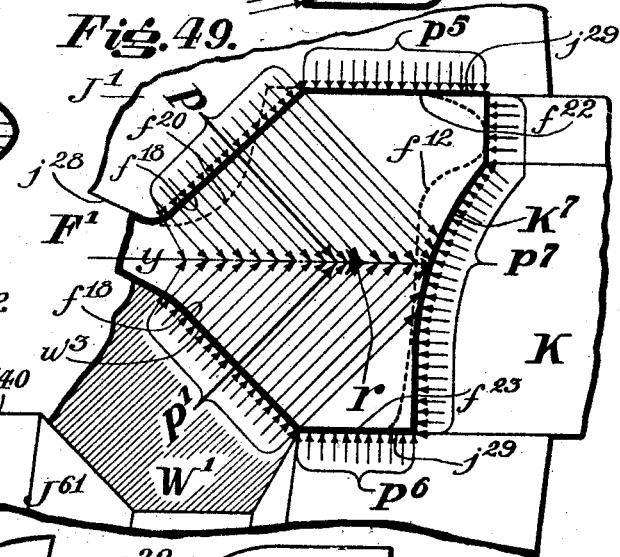
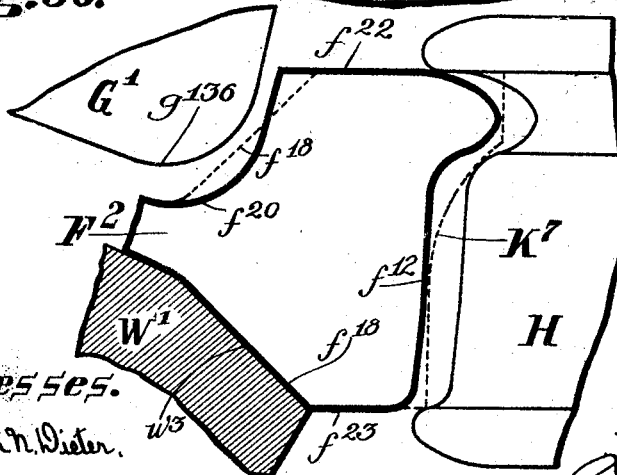

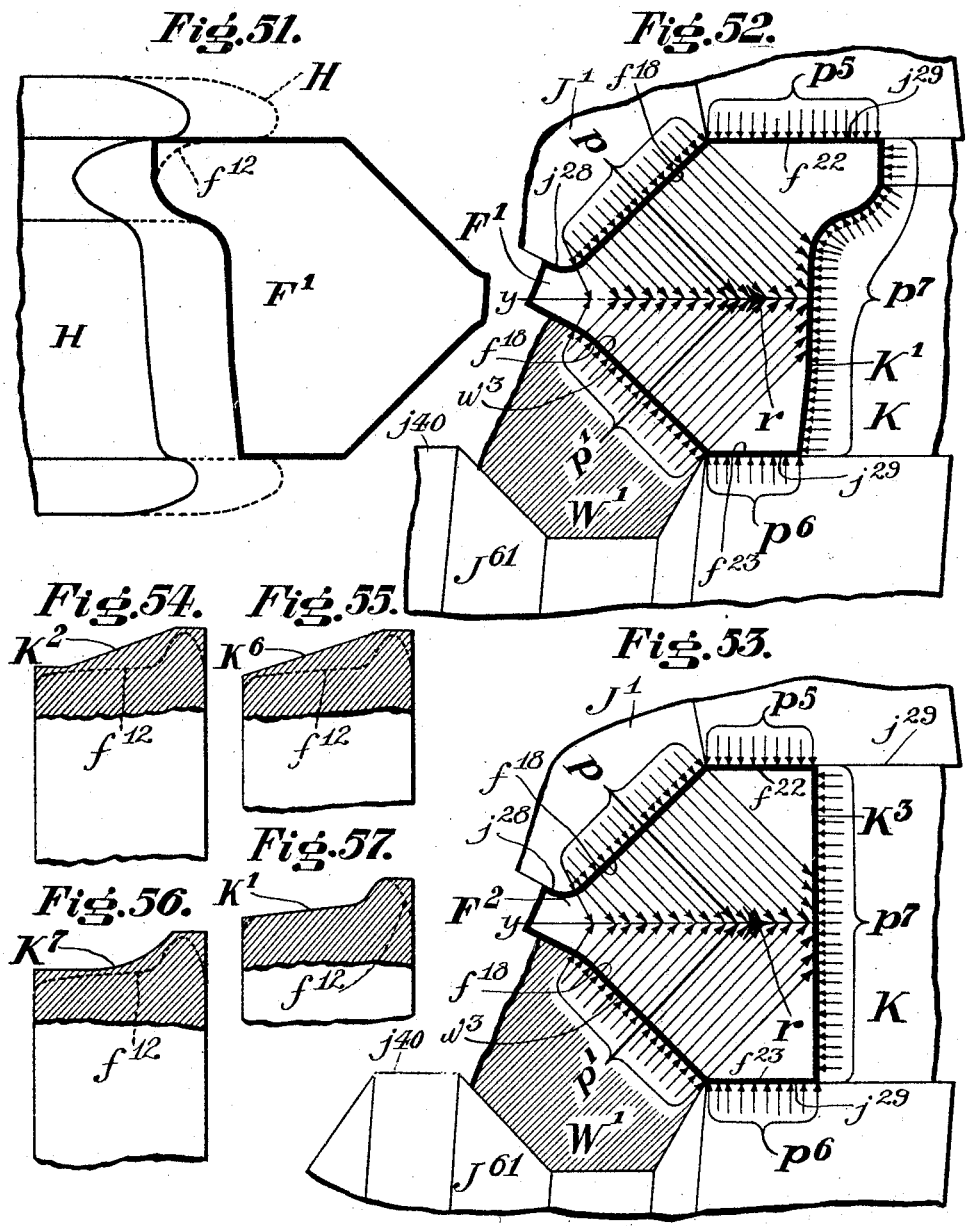

L. F. DIETER.
DISHED CAR WHEEL OR SIMILAR BODY.
APPLICATION FILED NOV. 9, 1917.

1,377,618.

Patented May 10, 1921.
8 SHEETS—SHEET 8.

Witnesses.
Waldemar N. Dieter.
Francis T. Houlihan

Inventor.
Louis F. Dieter

UNITED STATES PATENT OFFICE.

LOUIS F. DIETER, OF BUFFALO, NEW YORK.

DISHED CAR-WHEEL OR SIMILAR BODY.

1,377,618.                 Specification of Letters Patent.        Patented May 10, 1921.

Continuation of application Serial No. 633,343, filed June 15, 1911, and a division of application Serial No. 195,922, filed October 11, 1917. This application filed November 9, 1917. Serial No. 201,155.

*To all whom it may concern:*

Be it known that I, LOUIS F. DIETER, a citizen of the United States, residing at Buffalo, in the county of Erie and State of New York, have invented new and useful Improvements in Dished Car-Wheels or Similar Bodies, of which the following is a specification, accompanied by eight sheets of drawings.

The features of my invention claimed herein are related to the invention of my original application filed June 15, 1911, Serial No. 633,343, Patent No. 1,243,050 and of my application filed October 11, 1917, Serial No. 195,922, Patent No. 1,319,143. This application is a continuation of my said original application, Serial No. 633,343, Patent No. 1,243,050 and a division of my said application, Serial No. 195,922, Patent No. 1,319,143 and, the parts of an apparatus or mill, such as I prefer to employ to carry out my invention and shown in the accompanying drawings are illustrative of parts of my said Patent No. 1,243,050 and my said Patent No. 1,319,143.

The method of and means I prefer to employ for producing car-wheels or other circular articles embodying my invention form no part of this invention, as this is claimed in and the present invention is also described or partly described in the following applications filed by me, viz: said original application for patent filed June 15, 1911, Serial No. 633,343, Patent No. 1,243,050; application for patent filed October 10, 1916, Serial No. 124,921, Patent No. 1,243,051; application for patent filed November 20, 1916, Serial No. 132,372, Patent No. 1,243,052; application for patent filed November 22, 1916, Serial No. 132,815, Patent No. 1,243,053; application for patent filed January 10, 1917; Serial No. 141,558, Patent No. 1,246,067; application for patent filed June 22, 1917, Serial No. 176,333, Patent No. 1,319,141; and application for patent filed October 11, 1917, Serial No. 195,922, Patent No. 1,319,143.

The invention relates to dished car-wheels or other dished circular articles formed integral or in one piece and having a central or hub and web portion, and a rim or marginal portion.

In my said original application, the car-wheel or other circular body is centrally pierced or penetrated or centered and is rolled or formed by rolls operating against opposite sides and against the peripheral face of the work-piece and is dished while the work-piece is rotated by said rolls.

Applicant is aware that heretofore it has been proposed to roll car-wheels on a forming-die shaped to conform to the center or hub part, the web part and the rim part at one entire side of the car-wheel to be formed and also to conform to the outer or peripheral face of the car-wheel, the car-wheel being rolled on its other side only; that is, at one side of its web and at one side of the edge of its rim. During such rolling action, a work-piece of a given diameter will be rolled to much larger diameter and to the form of a car-wheel, such larger diameter being determined and governed by said forming-die. With such an arrangement, the metal in the work-piece is not worked at its outer peripheral face and therefore will be extended instead of being compressed; thus producing incipient cracks in the tread or outer peripheral face of the rim of the car-wheel.

In my application for patent filed October 9, 1917, Serial No. 195,637, Patent No. 1,319,142 the car-wheel or similar article is formed first into undished form by combined roll-forging and die-forging means, and is then dished while the same revolves, or left undished it being pierced or centered or penetrated and rolled at one side, thereby forcing metal of the work-piece against the forming-die, against or over a center or piercer passed axially through said forming-die or formed integral with said die, and into the depressed portion or portions, also beyond and over the peripheral edge of said die; the actual forming portion of the preferred forming-die reaching only to the inner peripheral face of the rim of the car-wheel or other article at one side thereof when finished and being shaped to conform to the center or hub part, the web part and the inner peripheral or inner circumferential face of the rim portion of the finished undished car-wheel or other circular undished body at one side thereof; all other portions or surfaces of the car-wheel or other body being rolled or formed directly by rolls and the car-wheel or other circular body being dished while the same revolves, or left undished, all as and in the manner shown and described in my said application filed October 9, 1917, Serial No. 195,637, Patent No. 1,319,142.

During the entire operating process the metal at the peripheral face of the work-piece is worked by a roll or rolls, whereby the metal in the whole rim portion is rolled or worked to uniform and maximum density, or practically so.

In this invention, which is the product of the invention covered by my aforesaid application filed October 11, 1917, Serial No. 195,922, Patent No. 1,319,143, the car-wheel or similar circular article is formed directly into dished form by combined roll-forging and die-forging means; it being pierced, or centered or penetrated, and rolled at one side, thereby forcing the metal of the work-piece against the forming-die, against or over a center or piercer passed axially through said forming-die or formed integral with said die, and into the depressed portion or portions, also beyond and over the peripheral edge of said die, the actual forming portion of the preferred forming-die reaching only to the inner peripheral face of the rim of the car-wheel or other article at one side thereof when finished and being shaped to conform to the center or hub part, the dished web part and the inner peripheral or inner circumferential face of the rim portion of the finished dished car-wheel or other circular dished body at one side thereof; all other portions or surfaces of the car-wheel or other body being rolled or formed directly by rolls, all as and in the manner hereinafter shown and described. During the entire operating process the metal at the peripheral face of the work-piece is worked by a roll or rolls, whereby the metal in the whole rim portion is rolled or worked to uniform and maximum density or practically so.

Another object of my invention is to provide as herein described such articles wherein, during the forming of the marginal or rim portion thereof, the metal has been compressed to greater density than the metal in the central or hub and web portion.

Another object is to provide, as herein described, such articles wherein, during the forming process, the metal in the marginal or rim portion, except the metal forming the periphery or flanged tread portion, has been worked or compressed to greater density or refinement than the metal in the central or hub and web portion, and the metal forming the periphery or flanged tread portion has been worked or compressed to still greater density or refinement than the metal in the remainder of said marginal or rim portion.

Another object is to provide, as herein described, such articles wherein the periphery or flanged tread portion is formed of metal of harder and of greater strength than the body portion.

Another object of my invention is the provision, as herein described, of such articles wherein the marginal or rim portion is formed stronger, more true and more durable than have heretofore been produced.

Another object is to provide such articles which are completely formed, as and in the manner herein described, and wherein the metal in the marginal or rim portion is compressed to uniform and to its maximum density or refinement, or approximately so.

Another object is to provide, as herein described, such articles in dished form, and composed of the qualities of metal as specified in the foregoing objects of my invention.

Another object is the provision, as herein described, of a dished wheel which is free or substantially free from initial or inherent stresses or strains.

Another object is to provide, as herein described, such articles as above specified, each formed in one heat with all its surfaces smooth and all its angles sharp and free from fins or other undesirable projecting part or parts.

Another object is to provide, as herein described, such articles as above specified, each formed at one or both sides with a preliminary central hole or a part or parts thereof, all in one heat in the same apparatus or mill.

Another object is to provide, as herein described, such articles which are true to their axes and which when on their axles or shafts are truly balanced or approximately so.

Another object is to provide such articles which, when completely formed, as herein described, have their central or hub and web portions, and their marginal or rim portions formed smooth without leaving any raised portions or fins which would have to be removed afterward by turning or other costly means.

A further object is the provision of a dished wheel having a central or hub and web portion and a rim or marginal portion, said central portion including the inner peripheral faces of said rim being die and roll forged and the rim or marginal portion including the outer peripheral face thereof being roll forged caused by rolls operating against the opposite sides and the peripheral face of said rim portion, said wheel being formed from an ingot, bloom, blank or other work-piece and having its hub pierced or penetrated.

A further object is to provide a dished car-wheel which may be partly die and roll forged and partly roll forged with one heat and without surplus metal which would have to be removed afterward by turning or other costly means.

A further object is to provide a dished car-wheel wherein also the hub portion is die and roll-forged and formed smooth and to proper form.

Further objects are to provide, as herein described, a rudimentarily formed dished car-wheel having its central portion die and roll-forged and being rolled on its periphery with two cylindrical or approximately cylindrical portions, one of which is of greater diameter than the other, and an intermediate concaved or conical, or approximately concaved or conical portion merging into said cylindrical portions; to provide a rudimentarily formed dished car-wheel, the inner peripheral face or faces of whose rim portion are formed sufficiently inclined outwardly toward the periphery of the wheel to have condensed or compressed the metal therein to uniform or to practically uniform density.

Further objects are to provide, as herein described, a dished car-wheel or similar dished shaped body whose peripheral face has been rolled, first to rudimentary form, or rolled for instance with two cylindrical or approximately cylindrical portions, one of which is of greater diameter than the other, and an intermediate concaved, or conical, or approximately concaved or conical portion merging into said cylindrical portions, and which rudimentarily formed peripheral face has been then rolled to finished form; to provide a dished car-wheel or similar dished body, one of the inner peripheral faces of whose rim portion has been rolled or formed first to rudimentary form, or rolled or formed sufficiently inclined outwardly toward the periphery of the wheel to have condensed or compressed the metal in the rim portion to uniform or to practically uniform density and which inner peripheral face has been then rolled to finished form; and to provide a car-wheel otherwise improved over wheels as now made.

Still further objects are to provide dished car wheels or similar dished shaped objects, which have been completely formed in dished form, from properly heated ingots, blooms, blanks or other work-pieces, including the piercing, or penetrating, or forming at opposite sides of the work-piece of a rudimentary bore, or a part or parts thereof, while at the same time having secured a uniform and maximum density and homogenity in the metal therein, which contributes materially to the strength and durability thereof. For instance, the metal in this wheel or similar article, when being formed from a blank or other work-piece according to my invention, is not expanded radially; especially is this avoided in the tread and flange or rim portion and therefore there is no possibility of the formation of incipient cracks in the tread and flanged portion or in the peripheral face of the rim.

The invention consists in novel dished car-wheels or other dished shaped circular articles of manufacture formed integral or in one piece and having a central portion or hub and web portion, and a rim or marginal portion herein described and more particularly pointed out in the claims, said central or hub and web portion being also termed the "body-portion" of the wheel or other article.

I prefer to carry out my invention with an apparatus or mill such as for instance described and claimed in my aforsaid original application and in applications filed by me and having the hereinbefore mentioned serial numbers and filing dates, as hereinafter shown and described and more fully shown and described in my said application Serial No. 195,922.

In the accompanying drawings, in which I have illustrated my invention together with devices or means I prefer to employ in carrying out my invention:

Figures 1, 2, 3, 4, 5 and 6, for instance, illustrate somewhat modified forms of the portion of the apparatus or mill illustrated in Fig. 9, as hereinafter described.

Fig. 5, shows in sectional view a car wheel formed with the forming-die, the herein named web finishing roll, the herein named die-supporting roll, a face rolling roll, and a face finishing roll as shown.

Fig. 6 is a similar sectional view; in this figure is shown a formed car wheel similar to Fig. 4. Said car wheel is formed with the forming-die, the herein named edging and web rolling roll formed wholly conical as shown, the herein named edging and die-supporting roll, the herein named web finishing roll, the herein named die-supporting roll, and a peripheral face finishing roll.

Figure 10:
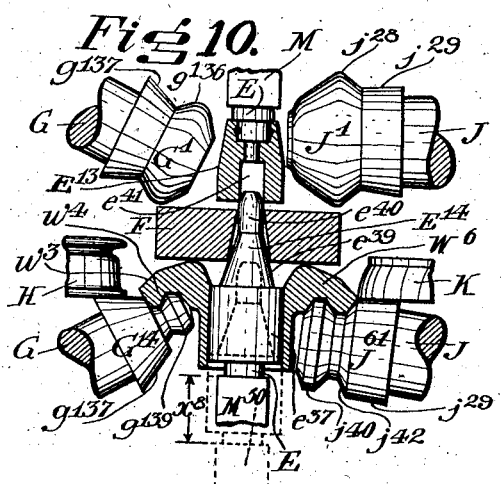

Fig. 7 is a sectional side elevation, on enlarged scale, showing the adjacent ends of the supporting heads, the piercers or centers supported thereby, the forming-die supported on one of said piercers or centers, and some of the rolls; therein is also shown a work-piece formed to the finished form of the car wheel shown at $F^2$; therein is also shown one of the supporting heads provided with roller-supports formed as shown and acting against or in contact with the forming-die as shown.

Fig. 8 is a similar sectional side elevation, showing one of the supporting heads provided with roller-supports formed as shown acting against or in contact with the marginal portion of the forming-die as shown.

Fig. 9 is a sectional plan view of a portion of one form of the apparatus or mill showing my method and device for centering or for piercing or penetrating and centering, and for forming, for instance, dished flanged car wheels; wherein an ingot, bloom, blank or other work-piece may also be centered or pierced or penetrated and centered and rolled with the use of the forming-die and with all the rolls of the apparatus or mill shown.

Figs. 10 to 26 show sectional views illustrating various combinations and different forms of rolls, piercers or centers, and forming-dies. These figures illustrate in accordance with my invention, certain piercing or centering or supporting steps and forming steps for producing the car wheel shown for instance in the Figs. 12, 15, 18, 21, 24 or 26, or other figures as hereinafter described.

Figs. 27 and 28 illustrate, for instance, certain steps according to my invention for reworking or reforming a dished car wheel, including the reworking of its hub portion.

Fig. 29 shows the forming-die and a portion of a work-piece in diametral section and illustrates the operation of piercing or penetrating the side of a portion of a work-piece next to the forming-die during the operating process, as hereinafter more fully described.

Fig. 30 is a similar sectional view as Fig. 29 and shows a different form of the forming-die and rolls associated with the forming-die.

Fig. 31 is a sectional view showing the forming-die and the work-piece or finished product in diametral sections. In this figure is shown for instance a formed disk-wheel, or gear blank, or a center such as used for instance in some tired car wheels; otherwise this illustration is similar to the illustration in Fig. 1. Said disk-wheel or center is formed with the forming-die, one of the herein named edging and web rolling rolls, one of the herein named edging and die-supporting rolls, one of the herein named die-supporting rolls, and a single face roll as shown. The die-supporting roll shown in this Fig. 43 may in some cases be omitted as in Fig. 1.

Fig. 32 shows a diametral section of an additional form of an ingot, bloom, blank, or other work-piece, the same may be solid as shown, or may either be provided with a central impression at opposite sides, or with a central hole.

Fig. 33 is a sectional view showing, for instance, a work-piece previously formed as shown and placed on the forming-die as shown. Therein is shown only the central portion of both the work-piece and forming-die.

Fig. 34 is a sectional view showing, for instance, a portion of another form of forming-die and the centering supporting means. The work-piece is not provided with a central hole, but the forming-die and center are provided with pins which pierce or penetrate the work-piece as shown. Therein is shown only the center portion of both work-piece and forming-die.

Fig. 35 is a sectional view showing, for instance, the central portion of the work-piece provided with a large central opening and still another form of centering means in which the centering element at one side of the work-piece is integral with the forming-die as shown. Therein is also shown only the central portion of the forming-die.

Fig. 36 is a sectional view showing the central portion of the work-piece previously formed as shown and provided with central depressions or pockets into which the piercers or centers are to be penetrated or entered, one of said piercers or centers being shown slidable within the forming-die. Therein is also shown only the central portion of the forming-die.

Fig. 37 is a sectional view showing the central portion of the work-piece provided with an axial or approximately axial opening and showing different forms of centering elements at opposite sides of the work-piece, the centering element at one side being in the form of a piercer or center as shown and the other being in the forming-die which also serves in forming a hub portion onto the work-piece and which forming-die is keyed or otherwise securely fastened to the work-supporting axle. Therein is also shown only the central portion of the forming-die.

Fig. 38 is a sectional view showing, for instance, a work-piece provided with an opening somewhat off center and illustrating the method of piercing or penetrating the work-piece centrally, regardless of the position of the opening therein.

Figs. 39, 40 and 41 show diametral sections of various additional forms of ingots, blooms, blanks or other work-pieces.

Fig. 42 shows diametral sectional view of a car wheel formed in accordance with my invention, the same being shown with the hub bored.

Fig. 43 shows a diametral section of a completely formed dished car wheel taken on line 43—43, Fig. 45, the same being shown with the hub bored, showing the inner peripheral surface of the rim, at one side thereof, formed to a different angle than the inner peripheral surface of the rim at the other side thereof.

Fig. 44 shows a diametral section of a dished car wheel completely formed in accordance with my invention, and showing the inner peripheral face of the rim at one side of the car wheel formed to the same angle as the inner peripheral face of the rim at the other side thereof, the same being shown with the hub bored.

Fig. 45 shows a fragmentary plan view of a car wheel, formed in accordance with my invention.

Figs. 46 and 47 illustrate diagrammatically improper flow of metal resulting from improper working of the metal in the rim portion of a car wheel or other circular object having a web, during the forming of said rim portion, all of which is avoided by my invention, as hereinafter described and also described in my said original application.

Fig. 48 illustrates, for instance, the proper flow of metal during the forming of a tire having no hub, such as used for some tired car wheels, as hereinafter described and also described in my said original application.

Figs. 49 and 50 are diagrammatic illustrations showing the result of the forming of the rim of a car wheel in accordance with my invention as hereinafter described, and also described in my said original application.

Figs. 51 to 53 are similar diagrammatic illustrations showing the result of the rolling or forming of the rim of a car wheel or other circular body directly to finished form in accordance with my invention as herein described. Fig. 52 shows the rim portion rolled with its flanged tread direct to finished form with the exception of rounding the outer corners of the flange and tread, and Fig. 51 shows said corners rounded with a separate finishing roll. Fig. 53 shows the rim portion having a straight peripheral face rolled direct to finished form.

Figs. 54 to 57 inclusive, show the flange and tread portions of car wheels and are diagrammatic views illustrating for instance a few shapes or ways of "beaking", as herein named and as hereinafter described and also described in my said original application.

Figure 58:
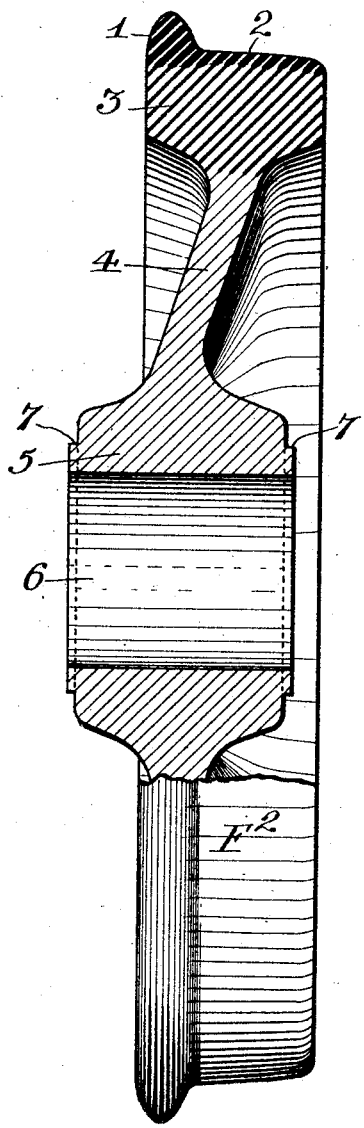

Fig. 58 is an enlarged sectional elevation of a dished car-wheel embodying my invention, the same being shown with the hub bored. Therein is also shown the metal condensed during the formation of the wheel by graduated section lines, or section lines of different widths, which show the metal in the whole rim portion except the metal forming the peripheral or flanged tread portion uniformly condensed and to a greater extent than the metal in the central portion or hub and web portions, as shown at 3 Fig. 58, and the metal forming the peripheral or flanged tread portion condensed to a still greater degree than said metal in said rim portion, as shown at 1 and 2 Fig. 58.

Figure 59:
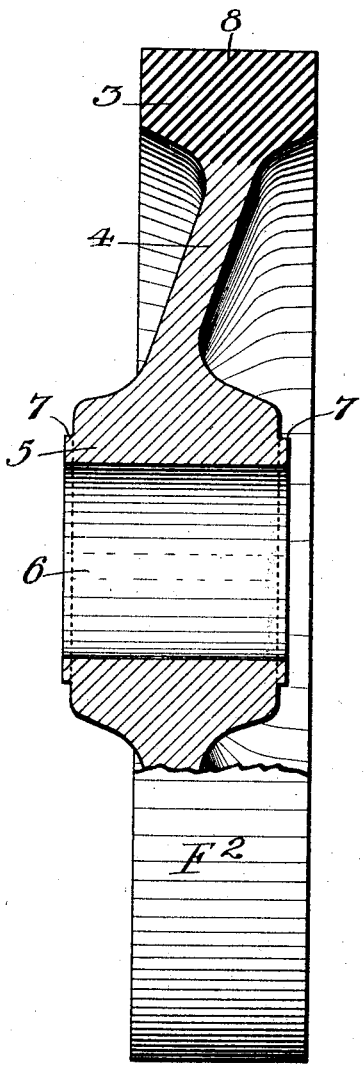

Fig. 59 is an enlarged sectional elevation of a dished article embodying my invention, such article for instance, as a disk-wheel or center such as for instance used in tired car wheels, or such article for instance as a gear blank, etc., the same being shown with its hub bored. Therein is also shown the metal condensed during the formation of the article by graduated section lines, or section lines of different widths, which show the metal in the whole rim portion uniformly condensed and to a greater extent than the metal in the central portion or hub and web portions, as shown at 3 Fig. 59.

The reference characters 4 and 5, in said Figs. 58 and 59 designate the hub and web portions or the central or body portion of the wheel or other article.

It is, of course, to be understood that I do not intend to limit myself to the use of the particular parts herein shown nor the use of the remaining parts of the apparatus or mill shown and described in my said original application, as other means may hereafter be devised for carrying out my invention in a practicable manner.

Similar characters of reference indicate corresponding parts throughout the several views and, the parts of my said original application herein shown and not changed in this application have the same characters of reference as in my said original application.

$B^2$ designates part of the bed-plate which forms part of a suitable frame or foundation for carrying or supporting the various parts of my apparatus or mill as fully shown and described in my said original application.

E, E are the herein named work-supporting axles which may be made of different lengths and may be formed and constructed differently to suit the various purposes for which they are intended, as hereinafter described. These axles are rotatably supported in supporting heads, M, $M^{50}$ and are arranged in alinement; one with its supporting head M being arranged at one side of the work-piece when the same is positioned in the apparatus or mill and the other with its supporting head $M^{50}$ being arranged at the other side of said work-piece or at one side of the forming-die, as shown in the drawing. These axles in addition to serving to support the work-piece also serve other purposes as herein shown and described and they are longitudinally movable as hereinafter fully described.

One of said axles E, E, that is the one which is supported in the supporting head M, has one of the herein named piercers or supporting centers detachably secured to its inner or operating end, as shown. The other axle which is supported in the supporting head $M^{50}$ has one of the herein named piercers or supporting centers detachably secured to its inner or operating end and which piercer or center is passed through the forming-die, as for instance, shown or is formed integral with the forming-die, as for instance shown. Said axles are interchangeable for different lengths or differently formed axles, as may be required. Although so named, these piercers or centers also serve other purposes as hereinafter described, and are longitudinally moved or operated as hereinafter described.

The piercers of supporting centers for the axle in the supporting head M are interchangeable, either on said axle or with said axle, and may have many different forms or shapes, as for instance $E^1$ in Fig. 16 or 31; $E^2$ in Fig. 27; $E^3$ in Fig. 34; $E^4$ in Fig. 35; $E^5$ in Fig. 37; $E^6$ in Figs. 1, 2, 3, 4, 5, 6, 7, 9, 19 or 36; $E^{13}$ in Fig. 10; or as for instance $E^{15}$ in Fig. 13, 22 or 25, &c. There is practically no limit to the forms or shapes that said piercers or supporting centers may have, as will appear from the matter hereinafter described.

Said piercers or supporting centers for the axle in the supporting head $M^{50}$ are interchangeable, either on said axle or with said axle, and may have many different forms or shapes, as for instance: $E^9$ in Fig. 1, 2, 3, 4, 5, 6, 7, 9, 16, 19, 29, 30, 31 or 38; $E^{12}$ in Fig. 8; $E^{14}$ in Fig. 10; $E^{16}$ in Fig. 13 or 22; $E^{17}$ in Fig. 25; or as for instance $E^{18}$ in Fig. 36, &c. There is practically no limit to the forms or shapes that said piercers or centers may have, as will appear from the matter hereinafter described.

Said piercer or supporting center for the axle in the supporting head $M^{50}$ has one of the herein named forming-dies, for instance $W^1$, $W^3$ or $W^6$ &c., which forming-dies may have many different forms or shapes, as for instance: $W^1$ in Figs. 1, 2, 3, 4, 7, 8, 9, 16, 19, 29, 31 or 36; $W^3$ in Fig. 27; $W^6$ in Fig. 10; $W^{11}$ in Fig. 30; $W^{13}$ in Figs. 5 or 6; $W^{14}$ in Figs. 13 or 22; $W^{15}$ in Fig. 34; $W^{16}$ in Fig. 35; $W^{17}$ in Fig. 37; $W^{18}$ in Fig. 33; $W^{20}$ in Fig. 25; or as for instance $W^{24}$ in Fig. 38 &c. Said forming-die is supported or partly supported by said piercer or center in such a manner that while it is rotated by rolls or the work-piece, or by both rolls and the work-piece, during the operating process, as hereinafter described, it also rotates said piercer or center together with the axle to which said piercer or center is secured, by means as for instance shown and described with reference to Figs. 29 to 38 inclusive. Said forming-dies may also be supported and rotated as for instance described in my application filed October 11, 1917, Serial No. 195,922. Each forming-die, in preferred form, is of a diameter which reaches only to the inner peripheral face of the rim at one side of the finished car wheel or other finished circular object and is shaped to conform to the center or hub part, the web part and the inner peripheral or inner circumferential face of the rim portion of the finished car wheel or other circular finished body at one side thereof. The forming-die is shaped to conform with the shape or form which the finished dished car wheel or other finished dished object is to have at said one side inside of said inner peripheral face of the finished rim portion, as shown. All other portions or surfaces of the work-piece are rolled directly by rolls, as hereinafter more fully described. During the entire operating process, the metal at the peripheral face of the work-piece is worked directly by a roll or rolls.

Said forming dies are each formed to provide the work-piece at one side thereof with a hub portion, a dished web portion and an inner peripheral face of a marginal or rim portion, or they are formed as and for the purpose hereinafter described.

F, $F^1$ and $F^2$ designate the work-piece from some of the various forms or shapes it may have when put into the apparatus or mill to some of the many various forms or shapes which the finished article or product may have. For instance, F, designates the ingot, bloom, blank or other work-piece in a few of the many various forms or shapes it may have when put into the apparatus or mill, either solid, as for instance F in Figs. 16, 19, 29, 32 or 34, or it may be previously formed, or pierced, as for instance F in Figs. 10, 13, 22, 25, 33, 35, 37 or 38; or it may have a central hole, as for instance F in Figs. 35, 40 or 41; or as $F^1$ in Fig. 27; or previously formed into form or shape, as for instance F in Figs. 36, 39, 40 or 41; or previously cast into any suitable form or shape, as for instance F in the Figs. 36, 39, 40 or 41; or it may be a previously formed or rolled car wheel or other previously formed body to be reworked or reformed, as for instance the car wheel or work-piece shown at $F^1$ in Fig. 27, which is shown reworked or reformed to the form or shape shown at $F^2$ in Fig. 28. Such previously rolled or otherwise formed car wheel or other article to be reworked or reformed in my apparatus or mill may also have any of the forms or shapes shown for instance at $F^2$ in Fig. 28, 31 or 42, or as shown at $F^1$ in Fig. 20, 23 or 27. There are a great many forms or shapes that the ingot, bloom, blank or other workpiece, or previously finished article may have when put into the apparatus or mill to be re-worked or re-formed, as for instance $F^2$, which represents the finished article or finished product from my apparatus or mill.

J, J designate the roll shafts, one of which has at its inner or operating end one of the herein named edging and web rolling rolls, and the other has at its inner or operating end one of the herein named edging and die-supporting rolls. Although so named, these rolls also serve other purposes, as hereinafter described.

Said edging and web rolling rolls are interchangeable and may have many different forms or shapes, as for instance $J^1$ in Figs. 1, 2, 9, 10, 19; $J^5$ in Fig. 4 or 6; $J^{55}$ in Fig. 22; $J^{56}$ in Fig. 27; or as for instance $J^{69}$ in Figs. 13, 16, 25 or 31, &c. In the preferred apparatus for producing car wheels or other circular articles embodying my invention, the said edging and web rolling rolls may be either removably attached to its shaft in such a way that the whole roll may be driven by its shaft, or only a part of the roll may be driven by its shaft and the other part or parts be permitted to turn loose; or the whole may be permitted to turn loose on a journal formed on its shaft or on a journal removably fastened to its shaft, all as described in my said original application. There is practically no limit to the forms or shapes that these rolls may have, as will appear from the matter hereinafter described.

Said edging and die-supporting rolls are interchangeable and may have many different forms or shapes, as for instance $J^{61}$ in Figs. 1, 2, 4, 6, 9, 10, 13, 16, 19, 22, 27, 29 or 31; or as for instance $J^{66}$ in Fig. 30. In the preferred apparatus for producing car wheels or other circular bodies embodying my invention, the said edging and die-supporting roll for instance $J^{61}$ or $J^{66}$, may be either removably attached to its shaft in such a way that the whole roll may be driven by its shaft, or only part of the roll may be driven by its shaft and the other part or parts may be permitted to turn loose; or the whole roll may be permitted to turn loose on a journal or journals formed on its shaft, or on a journal or journals removably fastened to its shaft, as shown and described in my said original application. There is practically no limit to the forms or shapes that these rolls may have, as will appear from the matter hereinafter described.

G, G designate the roll shafts, one of which has at its inner or operating end one of the herein named web finishing rolls, and the other has at its inner or operating end one of the herein named die-supporting rolls. Although so named, these rolls also serve other purposes as will appear from the matter hereinafter described.

Said web finishing rolls may have many different forms or shapes, as for instance $G^1$ in Fig. 3, 4, 6, 9, 10, 13, 16, 19, 22, 25 or 27; or as for instance $G^{55}$ in Fig. 5, &c. In the preferred apparatus for producing car wheels or other circular articles embodying my invention, the said web finishing rolls are interchangeable, as described in my said original application. There is practically no limit to the shapes that these rolls may have, as will appear from the matter herein after described.

Said die-supporting rolls are interchangeable and may have many different forms or shapes, as for instance $G^{14}$ in Fig. 3, 4, 6, 9, 10, 13, 16, 19, 22, 27, 29 or 31; $G^{48}$ in Fig. 30; $G^{61}$ in Fig. 5; or as for instance $G^{110}$ in Fig. 25. In the preferred apparatus for producing car wheels or other circular articles embodying my invention, the said die-supporting roll for instance $G^{14}$, $G^{48}$, $G^{61}$ or $G^{110}$ may be either removably attached to its shaft in such a way that the whole roll may be driven by its shaft, or only part of the roll may be driven by its shaft and the other part or parts may be permitted to turn loose; or the whole roll may be permitted to turn loose on a journal or journals formed on its shaft, or on a journal or journals removably fastened to its shaft. There is practically no limit to the forms or shapes that these rolls may have, as will appear from the matter hereinafter described.

K designates the herein named tread or face rolling roll which is adapted to act against the peripheral face of the work-piece to roll said face to a beaked or rudimentary form, or to partly finished or to completely finished form and which roll during the rolling process is moved toward, against or away from the peripheral face of the work-piece. The said movements of said roll are limited or controlled by adjustable stops provided in the mechanism for causing said movements, as more fully described in my said original application, and by means of said stops the radial distance or distances of said roll from the axis of the supported work-piece may be adjusted or controlled so as to suit any requirement and whereby said roll may be stopped and retained at any desired radial distance from the axis of the supported work-piece. Said tread or face rolling roll may also be supported so as to permit lateral movement of the same. The peripheral face of said roll may have also various different shapes as for instance described in my said original application and as hereinafter more particularly set forth, and said face roll may also serve other purposes; there being practically no limit to the shapes which the peripheral portion of said tread or face roll may have, or to the purpose for which said face roll may be used.

H designates the herein named tread or face finishing roll which is adapted to act against the peripheral face of the work-piece. This roll, during the rolling process, is adapted to be moved toward, against or away from the peripheral face of the work-piece and the movements of said roll are limited or controlled by adjustable stops provided in the mechanism for causing said movements, as more fully described in my said original application, whereby the radial distance or distances of said roll from the axis of the supported work-piece may be governed to suit the exact diameter of the car wheel when finished. After the car wheel has been rolled to its finished diameter, said roll acts as a rolling stop against the peripheral face of the work-piece, car wheel or other article, and maintains said finished diameter during any further operations against the work-piece, wheel or other article. The peripheral face of said roll may have also many different shapes, as for instance described more fully in my said original application, and as hereinafter more particularly set forth, and said face roll may also serve other purposes; there being practically no limit to the shapes which the peripheral portion of said tread or face finishing roll may have, or to the purpose for which said face roll may be used.

Said face rolls H and K may also be moved toward, against or away from the peripheral face of the supported work-piece, either together or independently of each other, as and in the manner described in my said original application.

In forming as herein described, for instance, car wheels or other circular articles embodying my invention, having each a hub, a dished web and a marginal or rim portion, the lateral thickness or width of said face roll K, in most cases, is the same as is the lateral thickness or width which the outer or rim portion of the car wheel or other article is to have when finished, as is shown for instance at K in the Figs. 1, 2, 9, 11, 12, 14, 15, 17, 18, 20, 21, 23, 24, 26, 27, 28 and 31. As shown in said figures, the opposite side faces of said face roll K are therefore also adapted to act for gaging the lateral thickness or width which the marginal or rim portion of the car wheel or other circular article is to have when finished. In some cases, said face roll K may be formed and be used as a face finishing roll, as for instance shown at K in Fig. 5, and in other cases said face roll may not be operating against the peripheral face of the work-piece but may serve other purposes. Said face finishing roll H, in some cases, may have a lateral thickness or width which is the same as is the lateral thickness or width which the outer or rim portion of the car wheel or other circular article is to have when finished, as shown for instance at H in Fig. 5, in which case the opposite side faces of said face roll H also serve to act for gaging the lateral thickness or width which the marginal or rim portion of the car wheel or other circular article is to have when finished; and in other cases said face roll H may not be operating against the peripheral face of the work-piece, but may serve other purposes.

A dished car wheel or other similar shaped article embodying my invention may also be formed as and in the manner shown in my said application filed October 11, 1917, Serial No. 195,922, that is to say, for instance, instead of forming a dished car wheel or similar article with the use of the herein named piercers or centers, the forming-die and all the rolls as herein described, for instance, with reference to Figs. 6, 9 and Figs. 10 to 28, a dished car wheel or other similar shaped article may also be formed to desired shape with only the use of the herein named piercers or centers, the forming-die, the herein named edging and web rolling roll, edging and die-supporting roll, and tread or face rolling roll; or, for instance, with only the use of the herein named piercers or centers, the forming-die, the herein named edging and web rolling roll, edging and die-supporting roll, tread or face rolling roll, and the herein named tread or face finishing roll. The forming of the dished car wheel or other similar shaped article with only the use of the herein named piercers or centers, the forming-die and said three or four rolls may, in some cases, give satisfactory results and when so forming the dished car wheel or other similar shaped article the inner circumferential face or faces of the rim portion may also be formed sufficiently inclined as and for the purpose hereinbefore described with reference, for instance, to Fig. 49, 52, or 53, and the peripheral face of the rim portion may be rolled to any suitable form described or rolled direct to desired finished form. With any of such arrangements, that is to say, with the use of the herein named piercers or centers, the forming-die and said three rolls, or with the use of the herein named piercers or centers, the forming-die and said four rolls, the hub and the web or central portion of the dished car wheel or other similar shaped article may be formed to desired shape with metal thereof of certain density or refinement and the rim portion of said dished car wheel or other similar shaped article may be formed to any desired shape with the metal thereof of greater density or refinement than the metal in said central portion.

In Fig. 9, I have illustrated a portion of the device I prefer to use for centering or piercing or penetrating ingots, blooms, blanks or other work-pieces, for supporting the same, and also for putting the work-pieces at their hubs or center portions while so supported by said piercers or centers, or by said centers and said forming-die, into a clamped condition laterally or axially between said piercers or centers and automatically keeping said hub or center portion in clamped condition by constant pressure during the forming process, as hereinafter described and also described in my said original application; said device co-acting with the forming-die for such purposes as will be hereinafter described.

The work-supporting axle of the supporting head M has one of said piercers or centers at one of its ends, as for instance $E^1$, $E^2$, $E^3$, $E^4$, or $E^5$, &c., and the work supporting axle E of the supporting head $M^{50}$ has one of said piercers or centers at one of its ends, as for instance $E^9$, $E^{12}$, $E^{14}$ or $E^{16}$, &c. Said supporting heads M, $M^{50}$ are moved or operated longitudinally in line with the axis of said piercers or centers by means of pressures in the cylinders (not shown herein) acting against the pistons and piston-rods $O^3$ and $N^3$ operatively connected with said heads M, $M^{50}$ (see Fig. 9), or by any other equivalent means, toward or away from each other, or they may be moved together in either direction; or one of them may be retained in any position while the other is moved toward or away from the one so retained, or they may be moved as the case may require. One of said supporting heads M, $M^{50}$, for instance, the head $M^{50}$, is operatively connected with the piston-rod $O^3$ and is moved by the pressure in the cylinder (not shown herein) operatively connected with said rod $O^3$. The other head M is operatively connected with the piston-rod $N^3$ and is moved by the pressure in the cylinder (not shown herein) operatively connected with said rod $N^3$.

By the words "centering, or piercing, or penetrating" used herein, I mean that the ingot, bloom, blank or other work-piece is centered, or pierced or penetrated by the apparatus or mill, by forcing either one or both of said piercers or centers, against or into the work-piece, by their pressure means operatively connected therewith, when the outer portion or periphery of said work-piece is brought coaxial, or approximately coaxial with the piercers or centers by means of the herein named positioning, or raising, lowering and retaining device shown and described in my said original application; or metal of the work-piece may be forced over and around any one of said piercers or centers, and this means herein that said work-piece is centered, or pierced or penetrated and centered, because said piercing or penetrating at the same time also centers said work-piece, for the reason that at the beginning of said centering or piercing or penetrating process, the outer portion or periphery of said work-piece is then coaxial, or approximately so, with said piercers or centers and is central with said forming-die, that is, said piercers or centers are then in the center or approximately in the center of the outer portion or periphery of said work-piece.

In Figs. 16 and 17, I have for instance illustrated in brief, one of the piercing or penetrating or centering processes or steps and one of the operations for forming a car wheel or other circular body including its central or hub portion such as I prefer to employ in carrying out the process of forming car wheels, &c.

In Fig. 16, the properly heated blank or work-piece F, shown in diametral section, may have a thickness which is either the same, or greater, or less than the length which the hub of the car wheel or other circular body is to have when rolled to finish. The work-piece F shown in Fig. 16 has been brought into the position shown by the herein named positioning, or raising, lowering and retaining device, such for instance as shown and described in my said original application, in which position the outer portion or periphery of the work-piece is co-axial or approximately so with the piercers or work-supporting centers, for instance $E^1$, $E^9$, and central with the forming-die, for instance $W^1$, and in which position, the work-piece is pierced or centered, for instance as described in the following: The supporting-head $M^{50}$ with its piercer or center $E^9$ and forming-die $W^1$ and the die-supporting roll $G^{14}$ and the edging and die-supporting roll $J^{61}$ are moved and adjusted into the positions shown, in which positions the flange or shoulder $e^{37}$ of said piercer or center $E^9$ is against the shoulder formed in said forming-die $W^1$ and holds the same against or in contact with the supporting portions of said rolls $G^{14}$ and $J^{61}$ and, the supporting or edging portion $g^{137}$ of said roll $G^{14}$ is in contact with one of the sides of the peripheral face finishing roll H, which roll H is a certain radial distance from the axis of the piercers or centers $E^1$, $E^9$, as for instance shown and, the edging roll part $j^{29}$ of the edging and die-supporting roll $J^{61}$ is in contact with one of the sides of the face roll K, which roll is in contact with the peripheral edge of said forming-die $W^1$ at the commencement of the operation as shown. In these illustrations, the roll $G^{14}$, the roll $J^{61}$, and the forming-die $W^1$ are retained in said positions during the operating process, and during the actual piercing or penetrating or centering process illustrated in Figs. 16 and 17, the piercer or center $E^1$ is forced into one side of the work-piece F, while said edging and web rolling roll, for instance $J^{60}$, formed as shown, rotates or assists in rotating the work-piece together with its forming-die $W^1$ and is forced or rolled against and into said side of the work-piece, thus causing the work-piece at its other side to be forced over the other piercer or center $E^9$ and causing metal of said work-piece to be forced into the hub-forming cavity of the forming-die $W^1$, around said piercer or center $E^9$ and against and over the forming-die $W^1$ as shown in Fig. 17, thus forming the side of the work-piece next to said forming-die W¹. During said rolling or forming process, the end of the roll part $j^{43}$ of said roll $J^{69}$ is either in contact with the peripheral face of said piercer or center E¹, as for instance shown in Figs. 16 and 17, or comes against said peripheral face of said piercer or center E¹ during said forming process and thus forms the other side of the work-piece while the work-piece is forced against said forming-die and with the aid of the face roll K it is formed to the form shown in Fig. 17. During this process, the roll portion $j^{43}$ of said roll $J^{69}$ operates against the end face of the hub as shown and the edging roll portion $j^{29}$ of said roll $J^{69}$ operates against the portion of the side of the work-piece between the web rolling part $j^{28}$ of said roll $J^{69}$ and the periphery of the work-piece, as shown in Fig. 17. During this operation, the face roll K has been moved away from the forming-die W¹, while the metal in the peripheral portion of the work-piece has been forced over the inclined peripheral face or edge $w^3$ of said forming-die W¹ and against the edging roll portion $j^{29}$ of said edging and die-supporting roll $J^{61}$, as shown in Fig. 17. Thus the work-piece is centrally pierced or penetrated or centered and rolled and formed to the form shown at F¹ in Fig. 17, and as hereinafter more fully described with reference to Figs. 16, 17 and 18. Said piercing or penetrating or centering may be done either before or during said hub-rolling or forming process, and said positioning, or raising, lowering and retaining device may be moved away from the work-piece either after or during the piercing or penetrating process. The side of the work-piece next to the forming-die may also be first pierced or penetrated before operation with the rolls, as illustrated for instance in Fig. 29, that is, when the work-piece is in proper position as shown by the portion of the work-piece F in Fig. 29, the piercer or center for instance E⁹ is forced into the work-piece for instance the distance $x^7$ as shown by the dotted lines, while the forming-die W¹, and the rolls $G^{14}$, $J^{61}$, H and K are retained in the position shown in Fig. 29.

In case that all the rolls of the apparatus or mill are used for forming a wheel or other article, as shown for instance in Fig. 9, the rolling or forming operation against the blank or work-piece having one side against the forming-die may begin with the herein named edging and web rolling roll formed as shown, the edging and die-supporting roll formed as shown, the tread or face rolling roll formed as shown, the forming-die formed as shown, the piercer or center of supporting head M formed as shown, and the piercer or center of supporting head $M^{50}$ formed as shown, and with these parts the blank or other work-piece may be formed to the form or shape $F^2$ such as shown for instance in the Fig. 20, &c., and with said rolls and forming-die in the position shown for instance in said Fig. 20, the herein named web finishing roll, for instance G¹, and the tread or face finishing roll H, may begin the finishing operation against the work-piece F¹, and roll the same to the form shown for instance in Fig. 21.

With the said work-piece supported on the piercers or work-supporting centers and on the forming-die, and with the hub or center portion of the work-piece automatically and firmly clamped laterally between said piercers or work-supporting centers, as for instance shown in Fig. 9, the piston-rod N³ of the cylinder N (which cylinder N is not shown herein) with said work-supporting head M and its axle E and piercer or work-supporting center, for instance E⁶, now under constant and continuous pressure from said cylinder N, causes said one piercer or work-supporting center E⁶ to press automatically and continuously toward and against the hub or center portion of this one side of said work-piece, while the piston-rod O³ of the cylinder O (which cylinder O is not shown herein) with the other work-supporting head $M^{50}$ and its axle E and piercer or work-supporting center, for instance E⁹, now under constant and continuous pressure from said cylinder O, causes said other piercer or work-supporting center E⁹ to press automatically and continuously toward and against the hub or center portion of said work-piece at the other side of said work-piece, as shown in Fig. 9. It is to be noted that the center or hub portion of the work-piece or car wheel, during my forming process, is firmly held in said automatically clamped condition between said piercers or centers, for instance E⁶, E⁹, while said piercers or centers and said forming-die are rotating with the work-piece or wheel. Should it be required to axially move the work-piece while so supported the pressure in one of said cylinders N or O, for example the pressure in said cylinder N is gradually somewhat relieved or reduced retaining therein however, the constant pressure required in said cylinder N to retain the aforesaid automatically axially clamped condition of the hub or center portion of the work-piece between said piercers or centers, for instance E⁶, E⁹; thereby causing the pressure or force from said cylinder O to overcome the resistance of the piston-rod N³ and gradually move the pistons and the rods O³, N³, with their said heads M, $M^{50}$, with the work-piece or wheel axially into the desired position.

Instead of so reducing the constant pressure in said cylinder N, said axial movement of the work-piece or wheel can also be done in the same manner, by increasing the constant pressure in said cylinder O so as to overcome the constant pressure in said cylinder N.

After the wheel or other article is completely finished, the rolls may be pulled back, as for instance shown in Fig. 19. The finished wheel or finished product taken out and replaced by another properly heated work-piece, &c.

Referring to Fig. 10, the axle E of the supporting head $M^{50}$ is provided with a piercer or center, for instance $E^{14}$ having a cylindrical portion $e^{37}$ slidably fitted in the central bore of the forming-die $W^6$, a tapered portion $e^{39}$ on which the work-piece F with its central hole is adapted to be supported, and a cylindrical portion $e^{40}$ slidably fitted into the central hole or bore $e^{41}$ of the center $E^{13}$ of the other supporting head M, as shown. When the work-piece F in the Fig. 10 is put into the apparatus or mill, the supporting head $M^{50}$ together with its axle E and piercer or center $E^{14}$ will be moved longitudinally from its position shown in solid lines to the position thereof shown in dotted lines, that is, the distance for instance indicated by $x^8$. When the work-piece is brought into the position shown in Fig. 10, said piercer or center $E^{14}$ will again be moved forward the distance indicated by $x^8$ in Fig. 10, into the position shown in Fig. 10.

Figure 13:
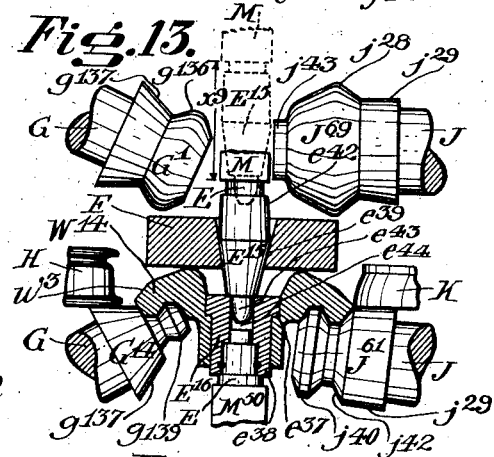

Referring to Fig. 13, the axle E of the supporting head M provided with a piercer or center for instance $E^{15}$ having adjacent its axle and a cylindrical or slightly tapered portion $e^{42}$ and next thereto a tapered portion $e^{39}$ on which the work-piece F with its central hole is adapted to be supported and, at the small diameter of said tapered portion $e^{39}$ said piercer or center is formed with a shoulder as shown. From said shoulder said piercer or center is formed with a cylindrical portion $e^{43}$ fitted into the central hole or bore $e^{44}$ of the center $E^{16}$ of the other supporting head $M^{50}$, and with its said shoulder said piercer or center $E^{15}$ is acting against or in contact with said other center $E^{16}$, as shown. When the work-piece F in Fig. 13 is put into the apparatus or mill, the supporting head M together with its axle E and piercer or center $E^{15}$ will be moved longitudinally from its position shown in solid lines to the position thereof shown in the dotted lines, that is, the distance for instance indicated by $x^9$. When the work-piece is then brought into the position shown in Fig. 13, said piercer or center $E^{15}$ will be moved forward again the distance indicated by $x^9$ in Fig. 13, into the position shown in Fig. 13. When the work-piece or wheel is ready to be removed, said supporting head M with its axle E and piercer or center $E^{15}$ will be pulled back into the position shown in dotted lines in said Fig. 13 and a new work-piece put into the apparatus or mill as and in the manner above described.

In Figs. 1 to 4 inclusive, the pressure cylinders O and N with their rods are omitted and only parts of the work-supporting heads M, $M^{50}$ are shown with their axles E, E and piercers or work-supporting centers, for instance $E^6$, $E^9$ and the forming-die for instance $W^1$, with different arrangements and forms of rolls. In these figures, the operations for putting in the ingot, bloom, blank or other work-piece and removing the finished article and for centering or for piercing or penetrating and centering the ingot, bloom, blank or other work-piece are similar to those described for instance in said Fig. 9. When it is desired to form an article with only such rolls as are shown in the said Figs. 1 to 4 inclusive, then in such case, the rolls not shown in these Figs. 1 to 4 inclusive, will not be used, and therefore may be omitted; or an apparatus or mill may be made without them. For instance; a wheel or other article is to be formed with only the rolls shown in Fig. 1, in which is shown, for instance, a car wheel ingot, bloom, blank or work-piece centered or pierced or penetrated and centered as before described and formed on piercers or work-supporting centers, for instance $E^6$, $E^9$ and on a forming-die, for instance $W^1$, with the herein named edging and web rolling roll, for instance $J^1$, edging and die-supporting roll for instance $J^{61}$ and tread or face rolling roll K, to the shape $F^2$ shown in the Fig. 1. A wheel or other article may be formed, for instance, with only the rolls shown in Fig. 2, in which figures is shown for instance, a car wheel ingot, bloom, blank or work-piece centered or pierced or penetrated and centered as before described and formed on piercers or work-supporting centers for instance $E^6$, $E^9$ and on a forming-die, for instance $W^1$, with the herein named edging and web rolling roll, for instance $J^1$, edging and die-supporting roll, for instance $J^{61}$, tread or face rolling roll K, and the herein named tread or face finishing roll H, to the form or shape $F^2$ shown in the Fig. 2.

In Fig. 3, I have shown an ingot, bloom, blank or work-piece formed with only the use of the rolls shown, and in this case is shown, for instance, an ingot, bloom, blank or other work-piece having been centered or pierced or penetrated and centered as before described and formed on piercers or work-supporting centers, for instance $E^6$, $E^9$ and on the forming-die, for instance $W^1$, with only the herein named web finishing roll, for instance $G^1$, die-supporting roll, for instance $G^{14}$, and tread or face roll H, to the form or shape $F^2$ shown in said Fig. 3. A car wheel blank, ingot, bloom or workpiece is shown in Fig. 4 formed only at its rim, tread and flange and at part of the web next to the rim with only the use of the rolls shown in said Fig. 4, in which is shown for instance, a car wheel blank, ingot, bloom or work-piece having been centered or pierced or penetrated or centered as before described and rolled or formed on piercers or work-supporting centers, for instance $E^6$, $E^9$ and on the forming-die, for instance, $W^1$ with only the use of the herein named web finishing roll, for instance $G^1$, die-supporting roll, for instance $G^{14}$, tread or face finishing roll H, edging and web rolling roll, for instance $J^5$, having the shape as shown, and edging and die-supporting roll for instance $J^{61}$, to the form or shape $F^2$ shown in said Fig. 4. In this case, such roll as $J^5$ may either be driven by its shaft J or it may be turning loosely on a bearing attached to the end of said shaft J, and the edging and die-supporting roll, for instance $J^{61}$, may either be wholly driven by its shaft or be partly driven by its shaft J and the other part or parts be in sections which are permitted to turn loose on a bearing or bearings provided therefor and which bearing or bearings are attached to the end of said shaft J.

In Fig. 5 is shown, an ingot, bloom, blank or work-piece rolled and formed only at its rim, tread and flange and at part of the web next to the rim with only the use of the rolls shown in Fig. 5; that is to say, Fig. 5 shows, for instance, a car wheel blank, ingot, bloom or work-piece having been centered or pierced or penetrated as before described and rolled and formed on piercers or centers, for instance $E^6$, $E^9$ and on the forming-die, for instance $W^{13}$, with only the use of the herein named web finishing roll, for instance $G^{55}$, die-supporting roll, for instance, $G^{61}$, tread or face roll H having a peripheral rolling face $H^4$ and being formed, as shown, and tread or face roll K having a peripheral rolling face $K^{38}$ and being formed as shown, to the form or shape $F^2$ shown in Fig. 5. In Fig. 6 is shown a car wheel rolled and formed to the form shown in a similar manner and with similar operating parts as shown in Fig. 4.

From the foregoing it will now be observed that, the piercers or work-supporting centers, together with the forming-die, revolubly or rotatably support the work-piece and that with the constant pressures in said cylinders N and O (which cylinders N and O are not shown herein) being operatively connected with said piercers or work-supporting centers by the means before described, and also shown and described in my said original application, said piercers or work-supporting centers are pressed or forced automatically by constant pressures in said cylinders toward and against each other or toward and against the opposite ends of the hub or against the opposite sides of the center portion of the work-piece, as and in the manner herein described.

In this manner the work-piece or wheel, while so supported by said piercers or work-supporting centers at its hub or center portion, is also automatically put into clamped condition laterally or axially at said hub portion between said piercers or work-supporting centers. Said automatic and constant pressure also serves other purposes. For instance, by constant pressures in said cylinders, the hub or center portion of the work-piece or wheel is also automatically and firmly clamped laterally or axially between said piercers or work-supporting centers, which is absolutely necessary in order to prevent said hub or center portion from being forced out of its true axial or central and desired lateral positions with respect to the remainder of the work-piece or wheel, during the forming or operating process, and this constant clamping force or constant clamping pressure automatically and continually remains during said operating process and automatically retains the hub or center portion of said work-piece in its true axial or central position during said operating process, or during any desired axial or lateral movement of the work-piece, or of the work-piece together with the forming-die. While the work-piece or wheel is so supported and is also so automatically and firmly clamped laterally or axially at its hub or center portion, said work-piece, or said work-piece together with the forming-die may be so automatically moved, or adjusted, axially together with its said piercers or work-supporting centers and to cause said automatic axial movement during the operation while the work-piece or wheel at its hub or center portion is in automatically clamped condition, it will only be required that either the constant pressure in only one of said cylinders N or O is gradually somewhat reduced so as to cause said automatic axial movement as desired; or, that the constant pressure in only one of said cylinders N or O, (which cylinders N and O are not shown herein) is gradually somewhat increased so as to overcome the pressure in the other cylinder and thereby cause said automatic axial movement as desired. With reference to Figs. 7 and 8 shown on an enlarged scale: Fig. 7 shows the work-piece formed as before described with reference, for instance to Fig. 9 and as hereinafter more fully shown and described. In this Fig. 7, the work-piece or wheel $F^2$ and forming-die $W^1$ are shown in diametral sections, and the opposite end parts of the alined supporting heads $M^{50}$, M are shown in side elevation, the end portions of the rolls $G^{14}$ and $G^1$ being also shown. Said parts $F^2$, $W^1$, $G^{14}$, M$^{50}$, G$^1$ and M in this Fig. 7 are shown in the positions they occupy at the end of the rolling and forming operation, the wheel F being shown finished and ready to be removed. In said Fig. 7 are also shown parts of the alined guides M$^{31}$, M$^{31}$ for said supporting heads M$^{50}$, M and the portions of the bed-plate B$^2$, B$^2$ to which said guides M$^{31}$, M$^{31}$ are fixedly secured. In Fig. 7 are also shown die-supporting rollers X$^{23}$, X$^{23}$ formed and located as shown.

Fig. 8 shows the end part of the supporting head M$^{50}$ with its axle E, piercer or center for instance E$^{12}$, formed as shown, forming-die for instance W$^1$ shown in diametral section, and die-supporting rollers X$^1$, X$^1$ formed and located as shown.

From the above it will be seen that, with the herein named edging and web rolling roll and the forming-die formed as herein shown and with the inner rolling or operating portion of the web reducing, or web rolling part $j^{28}$ of said edging and web rolling roll, for instance J$^1$, J$^{55}$ or J$^{56}$, &c., formed sufficiently conical in one direction, and with the peripheral forming portion or peripheral forming face of the forming-die adapted to form the inner peripheral edge or inner peripheral face of the marginal or rim portion of the work-piece or wheel at its one side formed sufficiently conical in the other direction, as and for the purpose hereinafter fully described with reference for instance to the Figs. 49, 50, 52 and 53, an efficient rolling and forming action is obtained, which during the formation of the web part, causes the metal to flow in the proper directions; that is to say, toward the rim part, within the latter, and peripheral thereto. The lateral flow of metal is limited by the roll parts $j^{29}$, $j^{29}$ of the edging and web rolling roll and the edging and die-supporting roll, and when this lateral flow of the metal is thus arrested, the continuous flow thereof will be peripheral to the rim. It will be observed that the radial flow of the metal is limited by the rolling surface of the tread or face rolling roll K, and when the radial flow is thus arrested, the continued flow of the metal will be peripheral to the rim, as for instance partly illustrated in Figs. 11, 14, 17, 49, 52 and 53. From this and from the matter described below with reference to Figs. 11, 14, 17, 49, 52 and 53 and with reference to other figures herein shown, it is to be observed that the metal, when being rolled and formed from the blank or other work-piece into a wheel or other article, is, especially in the tread and flange or rim portion, not expanded radially, and therefore does not produce incipient cracks in the tread and flange portions of the rim, but is truly worked and increases in density with increased working, thus giving to the metal both its due maximum strength and maximum resistance to wear. In other words, this method of rolling and forming produces the same effect in the metal of the rim portion as if the web portion of the wheel were not in existence and the rim portion rolled or formed its total width on its inner peripheral surface or surfaces as is done on its outer peripheral surface consisting of the tread and flange. In Fig. 17, for instance, is shown such edging and web rolling roll, for instance J$^{69}$, rolling or forming the hub part of the work-piece and the web and rim parts of the work-piece F$^1$ central with the hub part, and to the form as shown, and with the inner rolling or operating portion of the web reducing roll part $j^{28}$ of the edging and web rolling roll J$^{69}$ formed sufficiently conical and with the peripheral forming-face $w^3$ of the forming-die W$^1$ also formed sufficiently conical, as for instance shown and as and for the purpose hereinafter more fully described, the centers of the pressures caused by the so conically formed inner rolling or operating portion of said web reducing roll part $j^{28}$ of said roll J$^{69}$ and by the so conically formed peripheral face $w^3$ of said forming-die W$^1$, are illustrated in the Figs. 49, 52, and 53 as acting at the centers of the lengths of said conically formed inner rolling or operating portions and at right angles thereto against the work-piece, as is indicated by the arrows $p$ and $p^1$ of said pressures, and the resultant pressure $r$ from said pressures $p$ and $p^1$ is therein indicated in the direction shown by the arrow for said resultant pressure $r$. The actual flow of the metal will, therefore, be in a lateral, radial and peripheral direction, that is, toward the roll J$^{69}$ in Fig. 17, toward the portion $w^3$ of the forming-die W$^1$ and toward the edging roll portion $j^{29}$ of the roll J$^{61}$ (see Fig. 17) and peripheral to the rim and in a radial and peripheral direction; that is, toward the periphery of the work-piece in the direction of the arrow $r$ (see Figs. 49, 52 or 53) and against the face rolling roll K and from there the metal will flow peripheral to the rim. Said lateral flow of metal is limited by said edging roll parts $j^{29}$, $j^{29}$ of said rolls J$^{69}$ and J$^{61}$ (see Fig. 17) from where the metal will flow peripheral to the rim, and the said radial flow of metal is limited by the rolling surface of the said tread or face rolling roll K, from where the metal will flow peripheral to the rim.

Figs. 46 to 50 inclusive are sections of the rim portion of car wheels illustrating diagrammatically the flow of metal caused by various forms of rolls or other operating parts, and therein the pressures caused by the rolls or by the roll and forming-die against the surfaces of the metal in contact with the rolls or in contact with the roll and forming-die are assumed to be uniformly distributed from said surfaces, as indicated by the arrows pointing against said surfaces and the direction of the flow of metal from said arrows toward the inner region of the rim portion is indicated by the pressure lines of said arrows. The flow of metal illustrated by pressure lines parallel to each other indicate a uniform compression of metal. The flow of metal illustrated by diverging pressure lines indicate that said uniformly distributed pressures at said surfaces in contact with the rolls or other operating parts are becoming less toward the inner region and peripheral face of the rim portion, and therefore the metal in those portions of the rim having said diverging lines is not condensed to the same degree as is the metal in the portions having parallel pressure lines and which degree of condensing becomes less and less as the distances between said diverging lines becomes greater; and if the rim is not rolled at its outer peripheral face simultaneously with the rolling or forming of its inner peripheral faces, the metal will be extended instead of compressed and thereby produce incipient cracks in the tread or outer peripheral face of the rim. The finished peripheral face of the car wheel is indicated by $f^{12}$ and the outline of each of said sections is shown in heavy lines. In the Figs. 46, 47 and 48 the center line of the rim and adjacent web portion is indicated by $y$, and said inner face or faces of the rim portion in contact with the rolls or other operating parts are indicated by $f^{16}$. In Fig. 46 the portions of the rim in which the metal is not properly condensed is indicated by the distances $d^1$, $d^2$ occupied by said diverging lines. In Fig. 47 the portions of the rim in which the metal is not properly condensed is indicated by the distances $d^3$, $d^4$ occupied by said diverging lines. The rolling or forming of the rim portion as and in the manner described with reference to Figs. 46 and 47 does not properly work the metal in the rim and therefore forms a rim which during the rolling process, has already been weakened where its strength is needed and of which the tread will wear out quickly and shorten the life of such wheel, all of which may be observed on present wheels in actual use. In Fig. 48 is illustrated a section of a tire having for instance no web, such as used for some tired car wheels. From this figure it can easily be observed that the metal in such objects having a straight inner face without a web as shown, can be rolled to practically uniform density, as indicated by the parallel pressure lines for the total pressure P, and the metal in the rim portion of car wheels and similar objects having each a web formed integral with the rim, can be rolled or formed in accordance with my invention to practically uniform and maximum density, as can be done with rims having no web portion.

Therefore and in order to produce car wheels or other like articles embodying my invention having said effects or results in the metal of the rim portions thereof as herein referred to with reference to Figs. 49, 50, 52 and 53, and to entirely avoid the improper working of the metal described with reference to Figs. 46 and 47, I form the inner rolling or operating portion of the web reducing part $j^{28}$ of said edging and web rolling roll for instance $j^1$ and the portion $w^3$ of the forming-die, for instance $w^1$ (see Figs. 49, 52 or 53), sufficiently conical, so that, during the operating process against the work-piece, the face of said conically formed portion of $j^{28}$ of said roll $J^1$ is sufficiently inclined from its lateral apex toward the inner end of the roll $J^1$ and the portion $w^3$ of said forming-die $W^1$ is sufficiently inclined toward the inner end of the roll $J^{61}$; that is to say, that when for instance, the web reducing part $j^{28}$ of said roll $J^1$ and the forming side of the forming-die $W^1$ are against the finished web, then said face of said conically formed portion of each of said parts $j^{28}$ and $w^3$ is sufficiently inclined from the web outwardly in the direction away from the axis of the work-piece, as for instance in Figs. 11, 17, 49, 52 and 53. Said inclination of each of said parts $j^{28}$ and $w^3$ I therefore form sufficiently large enough so as to form the inner peripheral faces of the rim portion sufficiently inclined outwardly toward the peripheral face of the work-piece so that during the forming of the rim portion, for instance to the rudimentary form shown for instance in the Figs. 11, 17 and 49, the metal is caused to flow in the proper directions to assure compression of the metal in said rim portion to uniform or to practically uniform density, as is distinctly shown and diagrammatically illustrated in Fig. 49, 52 or 53. In Figs. 49 and 50 is diagrammatically illustrated and distinctly shown the result of the forming of the rim of a car wheel embodying my invention hereinbefore and hereinafter described with reference to other figures.

Fig. 49 distinctly shows what is meant by the herein used words "sufficiently conical" or "sufficiently inclined" and therein is shown said rim portion formed for instance to the rudimentary form shown for instance in the Figs. 11, 14, 17 and other figures; and in Fig. 49 is also shown in dotted lines said rim portion rolled to finished form, and the center pressures $p$, $p^1$ are the same as before described with reference to Figs. 49, 52 or 53; the pressure lines for each of said pressures $p$, $p^1$ being parallel to each other in the directions of the arrows and at right angles to said inclined faces of said parts $j^{28}$ and $w^3$. The pressures $p$, $p^1$ from said sufficiently inclined face of said roll part $j^{28}$ and from said sufficiently inclined face $w^3$ of the forming-die $W^1$ thus applied during the forming of said inner rim portion have rolled and formed said inner faces $f^{18}$, $f^{18}$ of the so rudimentarily formed rim portion sufficiently inclined, as distinctly shown by the pressure lines for each of said pressures $p$, $p^1$, which caused the metal during said rolling and forming of the rim portion to flow in the proper directions to be compressed to uniform density, as distinctly illustrated by said parallel pressure lines for each of said pressures $p$, $p^1$, while at the same time the pressures $p^5$, $p^6$ against the lateral sides of the rim from the edging roll parts $j^{29}$, $j^{29}$ of said rolls $J^1$ and $J^{61}$ and have caused the metal to flow into the inner region of the rim in the direction of the arrow of the pressure lines for said pressures $p^5$, $p^6$ and have rolled the rim to desired lateral thickness and while at the same time the pressure $p^7$ against the peripheral face of the rim portion from the face beaking or face roughing roll K having its rolling face $K^7$ formed as shown, has caused the metal to flow also into the inner region of the rim in the direction of the arrows of the pressure lines for said pressure $p^7$ and has rolled the peripheral face to the beaked or rudimentary form $K^7$ as shown, thereby having rolled said metal in the rim and adjacent web portion simultaneously on all its surfaces by rolls, with the exception of the one inner peripheral face of the rim formed with the inclined face $w^3$ of the forming-die $W^1$; all such rolls being situated in a plane passing laterally through said rim and adjacent web portion and having compressed said metal simultaneously on all its surfaces to uniform and maximum density, or practically so, while at the same time the rim portion has been so rolled to said rudimentary form, shown for instance in the Figs. 11, 14, 17 and 49 and other figures. The so rudimentarily formed rim is then rolled or formed with rolls situated at another point of the rim portion to finished form whereby its metal is still further condensed, as diagrammatically illustrated in the Fig. 50. In Fig. 50, said so rudimentarily formed rim portion, rolled or formed in accordance with my invention, is shown in dotted lines, and the finished rim and adjacent web portion shown formed in accordance with my invention during the finishing rolling process to finished form, is shown in heavy lines, and during the finishing rolling process with the rolls $G^1$ and H operating against the rim portion at another point thereof, with the aid of the forming-die $W^1$, the web finishing roll $G^1$ with its web finishing roll part $g^{136}$ rolls the inclined face $f^{18}$ at one side of the work-piece to the finished form $f^{20}$, while the inclined face $f^{18}$ of the other side of the work-piece maintains its form $f^{18}$. Simultaneously therewith, the peripheral face finishing roll H is rolling said beaked or rudimentarily formed peripheral face $K^7$ to the finished form $f^{12}$ and the edging roll parts $j^{29}$, $j^{29}$ of said rolls $J^1$ and $J^{61}$ are still operating in contact with the sides $f^{22}$, $f^{23}$ of the rim at another point thereof and are limiting the lateral flow of metal and maintaining the lateral thickness in the rim to which the same has been rolled during the rolling described with reference to Fig. 49; the combined action of said forming-die $W^1$ and said rolls $J^1$, $J^{61}$, $G^1$, and the die-supporting roll, for instance $G^{14}$, and the face finishing roll H during said finishing rolling process, roll or form the rim and adjacent web portion to the finished form shown in Fig. 50. Said Figs. 49 and 50 distinctly show and diagrammatically illustrate that the metal in the whole rim portion, rolled or formed in accordance with my invention, is rolled or worked to uniform and maximum density, or practically so, especially in the tread, flange and root of the flange where the strength and resistance to wear is mostly needed. It is, of course, to be understood that in order to produce said results, the rim portion must be formed first, for instance, to rudimentary form, as and in the manner described with reference to Fig. 49, before the same is rolled to the finished form shown in the Fig. 50, and that the rolling of the said inclined face $f^{18}$ and the rolling of said beaked peripheral face $K^7$ to their finished forms during the finishing rolling process will not disturb the density of the metal to which it has been compressed during the process described with reference to Fig. 49, but will still more compress the metal, especially so in the tread, flange and root of the flange where the strength and resistance to wear is mostly needed, as can easily be seen from said Fig. 49.

From the foregoing it will now be observed that, in forming for instance car wheels with the edging and web rolling roll and the edging and die-supporting roll formed as herein shown and as and for the purpose described with reference to Figs. 49 and 50, and with the lateral thickness or width of said tread or face rolling roll K being the same as the lateral thickness or width which the rim portion of the car wheel is to have when finished, as is for instance shown in the Figs. 1, 2, 11, 14, 17, 20, 23, 26, 27 and 31, and diagrammatically illustrated in Figs. 49, 52 and 53, thereby, and with said roll K formed as shown and as and for the purpose herein described and diagrammatically illustrated in Figs. 49 and 50, and with the said edging and web rolling roll and said edging and die-supporting roll formed as for instance herein shown and as and for the purpose above described with reference to the Figs. 49 and 50, and with all said edging and web rolling roll and said edging and die-supporting roll and said face roll K and the operating portion $w^3$ of the forming-die situated in a plane passing laterally through the workpiece at one side of its axis, the metal in the peripheral face and the whole rim portion of the work-piece or car wheel is worked continually, during the rolling or forming of the rim to rudimentary form, upon all its surfaces simultaneously with said operating portion $w^3$ of the forming-die and said three rolls so formed and so situated as before set forth and as shown for instance in said Figs. 14, 17, 49 and other figures, and in then rolling the so rudimentarily formed rim to finished form, as and for the purpose for instance described with reference to Figs. 49 and 50 and, which to my knowledge together with the result obtained thereby, as for instance above described with reference to the Figs. 49 and 50 was never done or accomplished before in rolling or forming car wheels, whereby the metal in said peripheral face and in the whole rim portion is uniformly condensed to its maximum, or practically so, thereby giving the metal in said peripheral face and in the whole rim portion its due maximum strength and its due maximum and uniform resistance to wear; and, as any surplus of metal in the work-piece may be worked during the rolling or forming process, for instance, into the inner rim and adjacent web portions, the said peripheral face and the whole rim portion of the car wheel can also be rolled or formed, by my process, smooth on all its surfaces to the desired form without leaving a raised circular portion or fin which would have to be removed afterwards by turning or other costly means.

Figs. 51, 52 and 53 are similar diagrammatic illustrations as Figs. 49 and 50. Figs. 51 and 52 relate, for instance to the rim of a car wheel rolled or formed in accordance with my process with only the use of a forming-die and the four rolls as described with reference for instance to Fig. 2; that is, with reference to Figs. 51 and 52 the rim is formed with the forming-die, for instance, $W^1$, the herein named edging and web rolling roll, for instance $J^1$, the herein named edging and die-supporting roll, for instance $J^{61}$, the face rolling roll K having its rolling face $K^1$ formed as shown, and the face finishing roll H. With such an arrangement, the rim portion is rolled or formed direct to finished form, with the exception that the outer corners of the tread and flange are rounded to proper form or shape with the finishing roll H situated at another point of the rim. Fig. 53 relates, for instance, to the rim portion of a gear wheel-blank, or of a disk-wheel, or a center such as used for some tired car wheels having a rim portion for instance similar to the one shown at $F^2$ in Fig. 31, and rolled or formed in accordance with my process, with only the use of the forming-die and the three rolls as, for instance, described with reference to Figs. 1 and 31; that is with reference to Fig. 53, the rim portion is formed with the forming-die, for instance $W^1$, the herein named edging and web rolling roll, for instance $J^1$, the herein named edging and die-supporting roll, for instance $J^{61}$, and the face rolling roll K having its rolling face $K^3$ formed as shown. With the arrangement shown in Fig. 53, the rim portion is rolled or formed direct to finished form, as shown. The pressure lines in said Figs. 52 and 53, are similar to the ones described with reference to Fig. 49.

Figure 12:
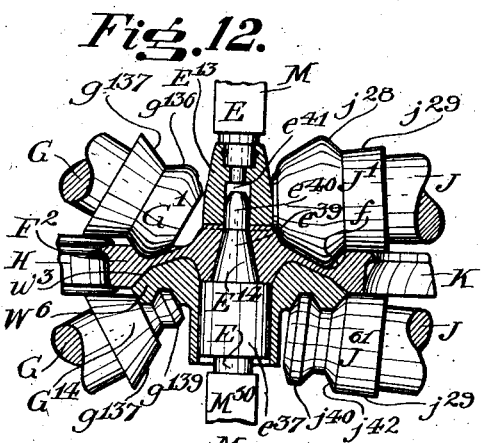

A dished car wheel or other circular dished article embodying my invention may also be formed as for instance described in the following with reference to Figs. 10 to 12 inclusive, in which I have, for instance, illustrated in brief, a forming process or steps according to my process, such as I prefer to employ for completely forming the car wheel shown at $F^2$ in Fig. 12, from a blank or work-piece such as shown at F in Fig. 10 having, for instance, a central hole, as shown. In these figures the forming-die $W^6$ is formed at its one side with a long central hub portion, as shown. The axle E of the supporting head $M^{50}$ is provided with the piercer or center $E^{14}$. This piercer or center $E^{14}$ is formed with a cylindrical portion $e^{37}$ which is slidably fitted into the bore of the hub portion of said forming-die and centrally supports said forming-die. Said piercer or center $E^{14}$ is also formed with a tapered portion $e^{39}$ on which the work-piece is adapted to be supported and, with a cylindrical end portion $e^{40}$ which is slidably fitted into a central bore $e^{41}$ formed in the center $E^{13}$ of the other supporting-head M, as shown. The axle E of the supporting head M is provided with the center $E^{13}$ which has at its outer end next to the work-piece a central bore $e^{41}$ slidably over the end portion $e^{40}$ of said piercer or center $E^{14}$, as shown. The outer end face of this center $E^{13}$ adjacent to the work-piece is formed straight and the diameter of said end face of said center is the same or is less than the smallest diameter which the hub at the side of the work-piece adjacent said center is to have when finished. The peripheral face of said center $E^{13}$ is preferably formed conical so as to permit the end face of the roll $J^1$, as shown, to properly come in contact with said peripheral face during the operating process for forming the hub. The forming-die $W^6$, the die-supporting roll $G^{14}$, and the edging and die-supporting roll $J^{61}$, are moved and adjusted into the proper positions, as for instance shown in Fig. 10, and therein they are rotatably retained during the operating process. In such positions, the roll $G^{14}$ is supporting the forming-die with its die-supporting portion $g^{139}$ in both radial and lateral or axial directions and, with its edging or supporting portion $g^{137}$ it is against or in contact with the face finishing roll H as shown, and the roll $J^{61}$ is supporting the forming-die with its die-supporting portion $j^{40}$, in both radial and lateral or axial directions and with its edging roll portion $j^{29}$ it is against or in contact with the face rolling roll K, as shown. Said die-supporting portion $j^{40}$ of said roll $J^{61}$, or the edging roll portion $j^{29}$ of said roll $J^{61}$ may be rotated or driven by its shaft J and the other part or parts of this roll may be made in a separate part or parts which are permitted to turn loose on a journal or journals provided on said roll $J^{61}$ or on its shaft J.

In the operation illustrated in Fig. 10, the face roll H is moved a certain radial distance away from the periphery of the forming-die $W^6$, as shown, and the face roll K is against or in contact with the peripheral edge of the forming-die $W^6$, as shown. The supporting head $M^{50}$ with its axle E and piercer or center $E^{14}$ are moved, for instance, the distance indicated by $x^8$ by means before described, into the positions shown by the dotted lines, after which the work-piece F is brought into the position shown and said parts $M^{50}$, E and $E^{14}$ are again moved, by the means before described, into the positions shown in Fig. 10, and in which positions said parts $M^{50}$, E and $E^{14}$ are retained during the operating process. The center $E^{13}$ of the axle E and supporting head M is then moved, by the said power or pressure means operatively connected with said head M, over said end part $e^{40}$ of said piercer or center $E^{14}$ and against one side of the work-piece F, while simultaneously therewith the roll $J^1$ is forced or rolled into said side of the work-piece and thus forces the metal of the work-piece at its other side into the hub-forming cavity of said forming-die $W^6$ and around the portion $e^{39}$ of said piercer or center $E^{14}$ and against and over said forming-die, and together with said face roll K forming the work-piece to the form shown in Fig. 11. During said operation, while the work-piece is increasing in diameter, the face roll K is continually operating upon the peripheral face of the work-piece and moves with the enlargement of said diameter, and while the work-piece is increasing in diameter, metal of the work-piece is forced over said inclined peripheral face $w^3$ of said forming-die $W^6$ and against the edging roll portion $j^{29}$ of said roll $J^{61}$, as is shown in Fig. 11. In this manner the work-piece is formed to the form shown at $F^1$ in Fig. 11. During the entire process, the edging roll portion $j^{29}$ of the roll $J^1$ is acting against or in contact with the portion of the work-piece between the web rolling part $j^{28}$ of said roll $J^1$ and the periphery of the work-piece at one side thereof, as shown, and the edging roll portion $j^{29}$ of roll $J^{61}$ is acting against or in contact with the other side of the marginal or rim portion of the work-piece, as shown.

Figure 11:
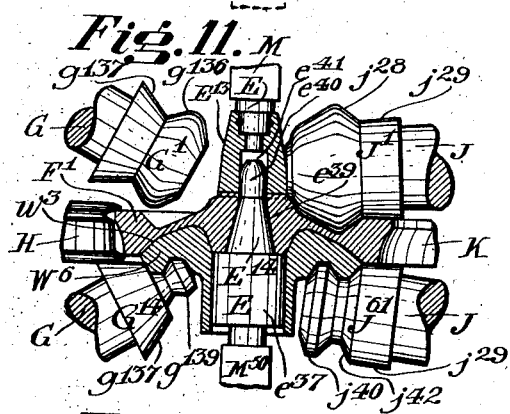

Fig. 11 shows said work-piece F rotatably supported and so rolled or formed to the form $F^1$ shown, with the outer end face of roll $J^1$ in contact with or against the peripheral face of said center $E^{13}$, and also with the roll $J^1$ against one side of the thus formed work-piece in the position shown at the end of the rolling or forming process above described and with the other side of the work-piece against said forming-die $W^6$ and against the edging roll portion $j^{29}$ of roll $J^{61}$, as shown. During the said operation the web of the work-piece has been formed as shown and has been reduced to its desired thickness and the inner peripheral face of the rim of the work-piece at one side thereof has been rolled or formed to the rudimentary form shown, while metal of the work-piece has been forced over said sufficiently inclined peripheral face $w^3$ of the forming-die $W^6$ and thereby having formed the inner peripheral face of the work-piece at the other side thereof to the sufficiently inclined rudimentary form shown, and as and for the purpose hereinbefore described with reference for instance to Figs. 49 and 50, while simultaneously with said operation of said roll $J^1$ against the work-piece, said face roll K is against or is operating against the peripheral face of the work-piece and rolls the same to the said beaked or rudimentary form, as shown for instance in Figs. 11 and 49. While the roll parts $j^{29}$, $j^{29}$ of said rolls $J^1$, $J^{61}$ are still operating in contact with the lateral sides of the rim portion, said finishing rolls $G^1$ and H, shown at the other side of the axis of the work-piece begin operating against the so rudimentarily formed rim portion and roll with said roll $G^1$ the so rudimentarily rolled inner peripheral face of the rim of the work-piece at one side thereof to the finished form and roll with said roll H the so beaked or rudimentarily formed peripheral face of the work-piece to the finished form shown at $F^2$, in Fig. 12. During this action, the edging roll parts $j^{29}$, $j^{29}$ of said rolls $J^1$, $J^{61}$ are maintaining the lateral thickness of the rim to which the same has been rolled during the process. It is to be noted that the center or hub portion of the work-piece or wheel, during said forming process, is firmly held in said automatically clamped condition between said centers $E^{13}$, $E^{14}$, or between said center $E^{13}$ and said forming-die $W^6$ while said centers and said forming-die $W^6$ are rotating with the work-piece or wheel. The work-piece or wheel shown at $F^2$ in Fig. 12 is finished and may be removed by moving the rolls $J^1$, $G^1$, K and H into the positions shown for instance in Fig. 10 and by moving said supporting head $M^{50}$ with its axle E and piercer or center $E^{14}$ into the position shown in dotted lines in Fig. 10, when the work-piece or finished product may be taken out and replaced by another work-piece, &c.

In rolling for instance the peripheral face of car wheels or similar articles embodying my invention, first to a beaked or rudimentary shape simultaneously with the forming of the rim portion to the rudimentary form shown for instance in Figs. 11, 17 and 49 and as and for the purpose hereinbefore described with reference to the Figs. 49 and 50, and then to the finished form, the tread or face rolling roll K with its peripheral face formed for instance as shown in Fig. 11, 17 or 49, &c., or a similar face, serves to beak the peripheral face of the work-piece or car wheel before rolling the same to finished form; that is, said roll K serves to preliminarily roll the peripheral face of the work-piece or wheel to beaked or rudimentary shape, for instance, to forms such as shown in Figs. 54, 55, 56 or 57, or to other rudimentary forms; such preliminary actions being herein termed "beaking." During such beaking and rolling or forming process the metal in the whole rim portion of the work-piece or wheel is worked continually and simultaneously upon all its surfaces, which gives the metal forming the tread, flange, and the whole rim portion of the work-piece or wheel the required uniform strength and density absolutely necessary for maximum and uniform resistance to wear. After this beaking action is completed, the finishing roll or rolls are brought into action and roll said beaked or rudimentarily formed peripheral face to the finished shape of the tread and flange of the wheel and roll the same to its desired finished diameter as, for instance, shown by the dotted lines $f^{12}$ for said finished peripheral face in Figs. 54, 55, 56 and 57, and diagrammatically illustrated in the Figs. 49 and 50, whereby the metal in the tread and flange and the whole rim portion is still further condensed. The car wheel thus formed in accordance with my process has its metal uniformly condensed to its maximum where it is subjected to greatest strain and wear, and at the point heretofore considered the weakest.

A dished car wheel or other circular article embodying my invention may also be formed, as for instance described in the following with reference to the Figs. 13 to 15, in which I have, for instance, illustrated in brief, a forming process or steps according to my process, such as I prefer to employ for completely forming dished car wheels, &c., including the rolling or forming of the end face of the hub at one side of the work-piece, directly with the edging and web rolling roll $J^{60}$, from a blank or work-piece shown at F in Fig. 13 having, for instance, a central hole, as shown. In these figures the forming-die $W^{14}$ is formed at one side with a central hub having a bore of two diameters forming a shoulder. The axle E of the supporting head $M^{50}$ is provided with the center $E^{16}$. This center $E^{16}$ is formed with a cylindrical portion $e^{38}$ and an enlarged cylindrical portion or flange $e^{37}$, and at its outer straight-faced end adjacent the work-piece it has a central bore $e^{44}$, as shown. This center $E^{16}$ is fitted into said bore in the hub of said forming-die $W^{14}$, thus supporting or partly supporting said forming-die. The axle E of the supporting head M is provided with the piercer or center $E^{15}$. This piercer or center $E^{15}$ has adjacent its axle-end a cylindrical or slightly tapered portion $e^{42}$, the peripheral face of this portion $e^{42}$ being preferably formed conical so as to permit the end face of the roll $J^{60}$ to properly come against or in contact with the said peripheral face during the operating process, and next to said slightly tapered portion said piercer or center has a tapered portion $e^{39}$ on which the work-piece F with its central hole is adapted to be supported. At the small diameter of said tapered portion $e^{39}$ said piercer or center is formed with a shoulder as shown, and from said shoulder said piercer or center is formed with a cylindrical portion $e^{43}$ having its end rounded off or formed as shown and which cylindrical portion $e^{43}$ is fitted into the central bore $e^{44}$ of said center $E^{16}$. During the operating process, said piercer or center $E^{15}$ with its shoulder at the small diameter of its tapered portion $e^{39}$ is pressing against the adjacent straight faced end of said center $E^{16}$ and, said centers $E^{15}$ and $E^{16}$ are so retained with each other during the operating process, as shown. The forming-die $W^{14}$, the die-supporting roll $G^{14}$, and the edging and die-supporting roll $J^{61}$ have been moved and adjusted into the proper positions, as for instance shown in Fig. 13, and they are rotatably retained in said positions during the operating process. When thus positioned, the roll $G^{14}$ with its die-supporting portion $g^{139}$ is supporting the forming-die in both radial and lateral or axial directions and with its edging or supporting portion $g^{137}$ it is against or in contact with the face finishing roll H as shown, and the roll $J^{61}$ with its die-supporting portion $j^{40}$ is supporting the forming-die in both radial and lateral or axial directions and with its edging roll portion $j^{29}$ it is against or in contact with the face rolling roll K, as shown. Said die-supporting portion $j^{40}$ of said roll $J^{61}$, or the edging roll portion $j^{29}$ of said roll $J^{61}$ may be rotated or driven by its shaft J and the other part or parts of this roll may be made in a separate part or parts which are permitted to turn loose on a journal or journals provided on said roll $J^{61}$ or on its shaft J.

At the commencement of the process illustrated in Fig. 13, the face roll H is moved a certain radial distance away from the periphery of the forming-die $W^{14}$, as shown, and the face roll K is against or in contact with the peripheral edge of the forming-die $W^{14}$, as shown. The supporting head M with its axle E and piercer or center $E^{15}$ are moved, by the means before described, into the positions shown by the dotted lines. The work-piece F is then brought into the position shown and said parts M, E and $E^{15}$ are again moved, by the means before described, into the positions shown in Fig. 13, in which positions said parts M, E and $E^{15}$ are retained during the forming process. In these figures, the edging and web rolling roll $J^{69}$ is preferably formed as shown; that is, the part $j^{43}$ of said roll $J^{69}$ is the roll part adapted to roll or operate, as shown, upon the end face of the hub at one side of the work-piece and, the part $j^{28}$ of said roll $J^{69}$ is said web reducing roll part, (which may however have any other desirable or suitable form or shape than herein shown), operating against part of the end face of the hub, the peripheral face of the hub, the web part, and the inner peripheral edge or inner peripheral face of the rim part of the work-piece at one side thereof. The part $j^{29}$ of said roll $J^{69}$ is the edging roll part operating upon and maintaining the lateral thickness of the rim and limiting therein the lateral flow of metal between said web reducing roll part $j^{28}$ of said roll $J^{69}$ and the periphery of the work-piece at its one side. While the work-piece and said forming-die may be rotated by said roll $J^{69}$, or by said roll $J^{69}$ and said forming-die $W^{14}$, which forming-die may be rotated by either or both said rolls $J^{61}$, $G^{14}$; said roll $J^{69}$ is forced or rolled into the side of the work-piece and thus forces the metal of the work-piece at its other side into the hub-forming cavity of said forming-die $W^{14}$ and around the portion $e^{20}$ of said piercer or center $E^{15}$ and against and over said forming-die, and together with said face roll K forming the work-piece to the form shown in Fig. 14. During said forming process the work-piece is increasing in diameter and the face roll K is continually operating upon the peripheral face of the work-piece and moves with the enlargement of said diameter. While the work-piece is increasing in diameter metal of the work-piece is forced, by the action of said roll $J^{69}$, over said inclined peripheral face $w^3$ of said forming-die $W^{14}$ and against the edging roll portion $j^{29}$ of said roll $J^{61}$, as shown in Fig. 14. The work-piece is thus formed to the form shown at $F^1$ in Fig. 14. During the entire process the edging roll portion $j^{29}$ of said roll $J^{69}$ is adapted to act against or in contact with portion of the work-piece between the web rolling part $j^{28}$ of said roll $J^{69}$ and the periphery of the work-piece at one side thereof, as shown, and the edging roll portion $j^{29}$ of roll $J^{61}$ is acting against or in contact with the other side of the marginal or rim portion of the work-piece, as shown.

Figure 14:
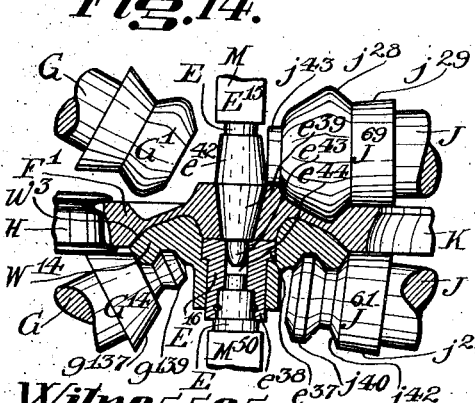
Figure 15:
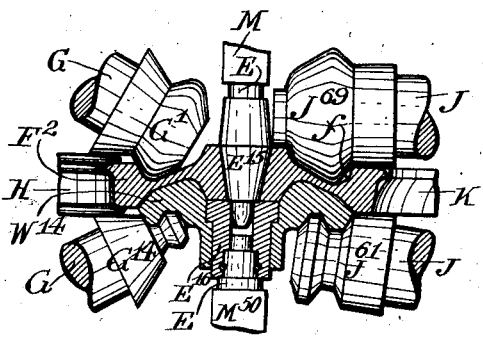

Fig. 14 shows said work-piece F so rolled and formed to the form $F^1$ shown, with the outer end of face roll $J^{69}$ in contact with or against the peripheral face of said piercer or center $E^{15}$, as shown, with the roll against one side of the thus formed work-piece in the position shown at the end of the forming process above described, and with the other side of the work-piece against said forming-die $W^{14}$ as shown. During said rolling or forming process the web of the work-piece has been formed as shown and has been reduced between the part $j^{28}$ of said roll $J^{69}$ and the forming-die $W^{14}$ to its desired thickness and the inner peripheral face of the rim of the work-piece at one side thereof has been rolled or formed to the rudimentary form shown, while metal of the work-piece at its other side has been forced over said sufficiently inclined peripheral face $w^3$ of the forming-die $W^{14}$ and thereby having formed the inner peripheral face of the work-piece at the other side thereof to the sufficiently inclined or rudimentary form shown, and as and for the purpose hereinbefore described with reference for instance to Figs. 49 and 50. Simultaneously with said operation of said roll $J^{69}$ against the work-piece, said face roll K is against or is operating against the peripheral face of the work-piece and rolls the same to the said beaked or rudimentary form, as shown for instance in Fig. 49. While the roll parts $j^{29}$, $j^{29}$ of said rolls $J^{69}$, $J^{61}$ are still operating in contact with the opposite sides of the rim portion of the work-piece, said finishing rolls $G^1$ and H, shown at the other side of the axis of the work-piece, begin operating against the so rudimentarily formed rim portion, and roll with said roll $G^1$ the so rudimentarily rolled inner peripheral face of the rim of the work-piece at one side thereof to the finished form and roll with said roll H the so beaked or rudimentarily formed peripheral face of the work-piece to the finished form shown at $F^2$ in Fig. 15. At the same time, the edging roll parts $j^{29}$, $j^{29}$ of said rolls $J^{69}$, $J^{61}$ are maintaining the lateral thickness of the rim to which the same has been rolled during the process. It is to be noted that the center or hub portion of the work-piece or wheel, during said rolling or forming process, is firmly held in said automatically clamped condition between said centers $E^{15}$, $E^{16}$ or between said center $E^{15}$ and said forming-die $W^{14}$ while said centers and said forming-die $W^{14}$ are rotating with the work-piece or wheel. The work-piece or wheel shown at $F^2$ in Fig. 15 is finished and may be removed by moving the rolls $J^{69}$, $G^1$, K and H into the positions shown for instance in Fig. 13 and by moving said supporting head M with its axle E and piercer or center $E^{15}$ into the positions shown in dotted lines in Fig. 13, when the work-piece or finished product will be taken out and replaced by another work-piece, &c.

A dished car wheel or other circular dished article embodying my invention may also be rolled or formed as for instance described in the following with reference to the Figs. 16 to 18, in which the roll $J^{69}$ may be the same and may be operated the same or similar to the roll $J^{69}$ described for instance, with reference to Figs. 13 to 15, and the roll $J^{61}$ may be the same and may be operated the same or similar to the roll $J^{61}$ described with reference to Figs. 10 to 15 inclusive, and the roll $G^1$ may be the same and may be operated the same or similar to the roll $G^1$ described for instance with reference to Figs. 10 to 15, and the roll $G^{14}$ may be the same and may be operated the same or similar to the roll $G^{14}$ described for instance with reference to Figs. 10 to 15. In these Figs. 16 to 18 inclusive, I have, for instance, illustrated in brief, a rolling or forming operation or steps, according to my process, such as I prefer to employ for completely forming the car wheel shown at $F^2$ in Fig. 18, including the rolling of the entire end face of the hub of the work-piece at one side thereof and the piercing or penetrating or centering of the properly heated work-piece from a blank or work-piece such as shown at F in Fig. 16, in which figure the work-piece F and the forming-die $W^1$ are shown in diametral section, and the work-piece may have a thickness which is either the same, or greater or less than the length which the hub of the car wheel is to have when formed to finish. The piercing or penetrating or centering of the work-piece is similar as hereinbefore described with reference to said Figs. 16 and 17. Fig. 16 shows said work-piece F brought into the position shown as and in the manner hereinbefore described with reference to said Figs. 16 and 17. In this case, said piercers or centers are formed as shown and the lengths of their penetrating portions $e^{39}$, $e^{39}$ are made to suit the location of the web portion of the car wheel, as shown; that is, the web portion of the wheel in this case will be formed in the center of the length of the hub of the wheel and said penetrating portions of said piercers or centers $E^1$, $E^9$ may both have the same length, which may reach to or near the center of the thickness of the finished web adjacent the hub portion of the wheel, as shown in Fig. 17. The forming-die $W^1$ is formed or shaped at its forming side to conform to the center or hub part, the web part, and the inner peripheral edge or inner peripheral face of the rim of the finished car wheel at one side thereof, as shown. At its other side next to the rolls $G^{14}$, $G^{61}$ this forming-die is formed with a central hub having a bore of two diameters so as to form a shoulder and it is also formed with a circular track or groove $w^4$ as shown. The axle E of the supporting head $M^{50}$ is provided with the piercer or center $E^9$, which is formed with a cylindrical portion $e^{38}$ and an enlarged cylindrical portion or flange $e^{37}$ and at its outer end adjacent the work-piece it is provided with the piercing or penetrating or forming portion $e^{39}$. The portions $e^{37}$, $e^{38}$ of said piercer or center $E^9$ are slidably fitted in the bore of the hub of said forming-die $W^1$, thus supporting said forming-die. The axle E of the supporting head M is provided with a piercer or center $E^1$. This piercer or center $E^1$ is formed adjacent its piercing or penetrating or centering part $e^{39}$ with an extension $e^{42}$ having a straight or approximately straight peripheral face, the diameter at the adjoining portion of said extension and said piercing or penetrating or centering part being the same or substantially the same. The peripheral face of the extension $e^{42}$ of said piercer or center $E^1$ is formed cylindrical or slightly conical so as to permit the end face of the roll $J^{69}$ to properly come against or in contact therewith during the operating process. The forming-die $W^1$, the die-supporting roll $G^{14}$, and the edging and die-supporting roll $J^{61}$ have been moved and adjusted, by means before described, into the proper positions shown in Fig. 16 and therein they are rotatably retained during the operating process. When thus positioned, the roll $G^{14}$ with its die-supporting portion $g^{139}$ is supporting the forming-die $W^1$ in both radial and lateral or axial directions and with its edging or supporting portion $g^{137}$ it is against or in contact with the face finishing roll H, as shown; the roll $J^{61}$ with its die-supporting portion $j^{40}$ is supporting the forming-die $W^1$ in both radial and lateral or axial directions and with its edging roll portion $j^{29}$ it is against or in contact with the face rolling roll K as shown. The die-supporting portion $j^{40}$ of said roll $J^{61}$, or the edging roll portion $j^{29}$ of said roll $J^{61}$ may be rotated or driven by its shaft J and the other part or parts of this roll may be made in a separate part or parts which are permitted to turn loose on a journal or journals provided on said roll $J^{61}$ or on its shaft J.

At the commencement of the process illustrated in Fig. 16, the face roll H is moved to a certain radial distance away from the periphery of the forming-die $W^1$, as shown; the face roll K is against or in contact with the peripheral edge of the forming-die $W^1$, as shown; and the work-piece F is brought into the position shown in this operating process, the edging and web rolling roll $J^{69}$ is preferably formed as shown; that is, the peripheral or operating face of the roll part $j^{43}$ of said roll $J^{69}$ is formed substantially straight as shown and is the roll part adapted to roll or operate, as shown, upon the end face of the hub of the work-piece at one side thereof. The part $j^{28}$ of said roll $J^{69}$ is the web reducing, or web rolling and forming part, which may however have any other suitable forms or shapes than herein shown and which operates as shown against the hub, the web, and the inner peripheral edge or inner peripheral face of the rim of the work-piece or wheel at one side thereof; that is, the web reducing roll part $j^{28}$ of said roll $J^{69}$ is operating against the work-piece at one side thereof and is forcing metal of the work-piece at its other side into the hub-forming cavity of said forming-die $W^1$ and around the penetrating or forming portion $e^{39}$ of said piercer or center $E^9$ and against and over said forming-die $W^1$ as shown in Fig. 17, together with said face roll K forming or shaping the work-piece to the form shown in Fig. 17. During said forming process and while the work-piece is increasing in diameter, the face roll K is continually operating upon the peripheral face of the work-piece and moves with the enlargement of said diameter. While the work-piece is increasing in diameter, metal of the work-piece is forced by said roll $J^{69}$ over said inclined peripheral face $w^3$ of said forming-die $W^1$ and against the edging roll portion $j^{29}$ of said roll $J^{61}$ as shown in Fig. 17. During the forming process, the inner rolling or operating portion of the part $j^{28}$ of said roll $J^{69}$ is operating on the inner peripheral edge or inner peripheral face of the rim of the work-piece at one side thereof and rolls or forms said inner peripheral face of said rim at one side of the work-piece to rudimentary form and sufficiently inclined toward the periphery of the work-piece, as shown, and also forces metal of the work-piece, at its other side, over said sufficiently inclined peripheral face $w^3$ of the forming-die $W^1$, thereby forming also the inner peripheral face of the work-piece at the other side thereof sufficiently inclined toward the periphery of the work-piece, as shown. The peripheral or operating faces of the edging roll parts $j^{29}$, $j^{29}$ of said rolls $J^{69}$, $J^{61}$ are formed substantially straight, as shown, and during the operating process come in contact with or against the opposite sides of the tread or face roll K, as shown. This edging roll part $j^{29}$ of roll $J^{69}$ is adapted to roll or limit the lateral flow of metal in the portion of the work-piece between the roll part $j^{28}$ of said roll $J^{69}$ and the periphery of the work-piece; or such rolls, as for instance, $J^{69}$ when used for other purposes may not have such web reducing roll part $j^{28}$, but be for instance wholly formed conical, as for instance shown at Fig. 5 in Figs. 4 and 6, and as shown and described in my said original application.

Fig. 17 shows the work-piece so rolled or formed as above described with its rim portion formed to said rudimentary form and with the edging roll portions $j^{29}$, $j^{29}$ of the rolls $J^{69}$, $J^{61}$ against or in contact with the opposite sides of the face roll K; the lateral width or thickness of said face roll K being the same as the lateral width which the marginal or rim portion of the work-piece or wheel is to have when rolled or formed to finish, as shown in Figs. 17 and 18. With the roll $J^{69}$ thus positioned, as shown in Fig. 17 and with the work-piece with its one side against the forming-die $W^1$, as shown, and while the edging roll parts $j^{29}$, $j^{29}$, of said rolls $J^{69}$, $J^{61}$ are still operating in contact with the opposite sides of the rim portion of the work-piece, said finishing rolls $G^1$ and H, shown at the other side of the axis of the work-piece begin operating against the so rudimentarily formed rim portion and, roll with said roll $G^1$ the so rudimentarily rolled inner peripheral edge or inner peripheral face of the rim of the work-piece at one side thereof to the finished form while said roll H rolls the so beaked or rudimentarily formed peripheral face of the work-piece to the finished form shown at $F^2$ in Fig. 18. At the same time, the edging roll parts $j^{29}$, $j^{29}$ of said rolls $J^{69}$, $J^{61}$ are maintaining the lateral thickness of the rim to which the same has been rolled during the process. It is to be noted that the center or hub portion of the work-piece or wheel, during said operating process, is firmly held in said automatically clamped condition between said piercers or centers $E^1$, $E^9$, or between said center $E^1$ and said forming-die $W^1$ while said piercers or centers and said forming-die $W^1$ are rotating with the work-piece or wheel. The work-piece or wheel shown at $F^2$ in Fig. 18 is thus finished and may be removed by moving said rolls $J^{69}$, $G^1$ K and H and said supporting head M with its axle E and piercer or center $E^1$ into the positions shown for instance in Fig. 16, when the work-piece or finished product will be taken out and replaced by another work-piece, &c.

A dished car wheel or other circular dished article embodying my invention, may also be formed as for instance illustrated in the Figs. 19, 20 and 21 in which I have shown a car wheel or similar body formed from a solid circular blank shown at F in Fig. 19. The piercing or penetrating or centering process is similar to the process hereinbefore described for instance with reference to Figs. 16 and 17, with the exception that in this case the piercer or center, for instance $E^6$ of the supporting head M, is provided with the flange or shoulder $e^{30}$, as shown; all other parts being similar to the corresponding parts shown in Figs. 16, 17 and 18, with the exception that in this case the hub end-face rolling portion $j^{43}$ of the roll $J^{69}$ is omitted on the roll $J^1$ shown in Fig. 19 since said flange or shoulder $e^{30}$ serves the same purpose as said rolling portion $j^{43}$. Otherwise the operation or steps illustrated in Figs. 19 to 21 inclusive may be the same or similar to the operation or steps for instance described with reference to Figs. 16 to 18 inclusive. Fig. 19 shows the work-piece and the operating parts in positions they occupy at or before commencement of operation. Fig. 20 shows the work-piece and the operating parts at the end of the hub, web and rim forming process. Fig. 21 shows the work-piece and the operating parts at the end of the forming of the work-piece to the finished form of the car wheel shown at $F^2$.

A dished car wheel or similar body embodying my invention, may also be rolled or formed as, for instance, illustrated in the Figs. 22 to 24 inclusive. Therein the operating parts and the operating process may be the same or similar to the ones described, for instance, with reference to Figs. 13 to 15 inclusive, with the exception that in place of the roll $J^{69}$, a roll $J^{55}$ is used, which roll $J^{55}$ in Figs. 22, 23 and 24, is formed or shaped somewhat different. Fig. 22 shows the work-piece F and the operating parts in the positions they occupy at the commencement of operation. Fig. 23 shows the work-piece rolled or formed to the form $F^1$, as shown. At the one side of the work-piece next to roll $J^{55}$, the hub with a portion only of the web, is shown rolled or formed, and the other portion of the web with the inner peripheral face of the rim portion, at said one side of work-piece, is rolled or formed during the finishing operation with the roll $G^1$, as indicated in Figs. 23 and 24. The work-piece or car wheel shown at $F^2$ in Fig. 24 is finished, and may be removed as before described.

In the Figs. 25 and 26, the work-piece F is similar to the work-piece F for instance in the Fig. 13, and the axle E and piercer or center $E^{15}$ with the supporting head M and the axle E and center $E^{17}$ with the supporting head $M^{50}$, with the exception of center $E^{17}$ which is somewhat longer, are similar to and may be operated in the same manner as before described with reference to Figs. 13 to 15 inclusive, and the roll $J^{69}$ is the same and may be operated in the same manner as before described with reference to Figs. 13 to 15. The roll $G^1$ is also the same and may be operated in the same manner as before described with reference to Figs. 10 to 15 and the roll $J^{74}$ and the die-supporting roll $G^{110}$ are in this case serving only to support the forming-die $W^{20}$ and are shown formed with stepped portions, each step portion having its peripheral face formed straight, or approximately so, and the side of the forming-die next to said rolls $J^{74}$, $G^{110}$, is correspondingly shaped to fit said stepped portions of said rolls $J^{74}$, $G^{110}$, thereby supporting said forming-die $W^{20}$ in both lateral and opposite radial directions and they may also be arranged so as to assist in rotating the forming-die $W^{20}$. In these Figs. 25 and 26, however, the forming-die $W^{20}$ is formed differently; that is, the circumferential face or periphery of the forming portion of this die $W^{20}$ reaches to a circle which, for instance, has a diameter equivalent to that portion of the finished side of the rim of the work-piece or wheel where the rounding off of the outer circumferential corner of the tread commences and at this circle the forming-die $W^{20}$ is formed with a circular off-set or shoulder $w^7$, and the tread or face finishing roll H has its peripheral or rolling face $H^1$ formed, as shown, with a circular flange $h^{17}$ provided with a fillet formed correspondingly with the rounded corner of said tread. When this face roll H is properly positioned at a certain radial distance from the axes of the piercer or center $E^{15}$ and the center $E^{17}$, the peripheral edge of said flange $h^{17}$ is in contact with said shoulder $w^7$ of said forming-die $W^{20}$, as shown at Figs. 25 and 26. The side of the rim of the work-piece or wheel next to the forming-die is therefore formed by the forming-die, and the peripheral face of the work-piece or wheel including its flange and the rounding off of the outer corner of the tread of the rim is rolled to finish with said roll H, as shown. The face beaking or face rolling roll K has its peripheral or rolling face $K^7$ formed as shown and at its side next to forming-die $W^{20}$ said roll K is formed or provided with the circular portion or extension $K^{17}$ as shown. At the commencement of operation, the roll K with its rolling face $K^7$ is moved against the peripheral portion $w^5$ of said die $W^{20}$ as shown in Fig. 25. When roll K is thus positioned the circular portion or extension $K^{17}$ of said roll K may be in contact with or be somewhat away from the shoulder $w^7$ of said die $W^{20}$, as shown in Fig. 25 thereby, during the operating process and while said roll K moves from the position thereof shown in Fig. 25 to the position thereof shown in Fig. 26, the one side of said roll K will be fully supported by said forming-die $W^{20}$, as shown. At the same time, the other side of said roll K will be against or in contact with the edging roll portion $j^{29}$ of said roll $J^{69}$ and thus one side of the rim portion of the work-piece or wheel is being formed by said forming-die while the other side of said rim portion is being rolled by the edging roll portion $j^{29}$ of said roll $J^{69}$, as shown in Fig. 26, which edging roll portion thus rolls said rim portion to desired width. In this process, said face roll H is positioned at the proper radial distance from the axes of said piercer or center $E^{15}$ and said center $E^{17}$ to suit the finished radius of the finished wheel and it is retained in said position during the forming operations. Otherwise the operating process or steps is similar to the operating process or steps before described with reference to Figs. 13 to 15.

In Figs. 27 and 28, is illustrated, for instance, a new or worn car wheel rolled, for instance, smaller in diameter. In this case the actual forming portion of the preferred forming-die reaches to the inner peripheral face of the rim of a car wheel at one side thereof when rolled or formed to its desired finished smaller diameter and it is shaped to conform to the dished web portion, the center or hub part, and the inner peripheral or inner circumferential face of the rim portion of the car wheel at one side thereof when rolled or formed to its desired finished smaller diameter. The piercing or penetrating or forming portion $w^1$ is formed integral with the forming-die $w^3$, as shown. Fig. 27 shows the work-piece $F^1$ placed onto the forming-die $W^3$ and the operating parts in the positions they assume at the beginning of operation against the rim portion of the work-piece $F^1$, and it also shows the center $w^1$ of the forming-die $W^3$ and the center $E^2$ of the axle E of the supporting head M forced or entered loosely into the central hole and over the peripheral face of the hub portion of the work-piece $F^1$; that is, the center $w^1$ of the forming-die is either forced or entered loosely into the bore and at the same time the peripheral face of the hub of the work-piece at the side next to the forming-die is forced into the hub-forming cavity of the forming-die, and the center part $e^{36}$ of the center $E^2$ is either forced or entered loosely into the bore while the flange $e^{35}$ thereof which surrounds said center part $e^{36}$ and is formed integral with said center $E^2$ is forced over the peripheral face of the hub portion of the work-piece at the other side thereof, thus making the hole in the work-piece or a part or parts thereof, either larger or smaller in diameter, as may be desired, so the wheel when finished may be rebored to its original diameter or to a smaller or larger diameter. The space or distance between the inclined peripheral face $w^5$ of the forming-die $w^3$ and the inner peripheral face of the rim of the work-piece at one side thereof, indicated by $f^{25}$, will be filled up with metal of the rim and adjacent web portion during this process, as shown in Fig. 28. In this case, the rolling or operating part $K^1$ of the face roll K is shown formed to conform with the peripheral face of the wheel when finished, with the exception that the outer corners of the tread and flange are not rounded with this roll K, but such rounding will be performed by the rolling or operating part $H^1$ of the face roll H, as shown in Figs. 27, 28 and also illustrated in Figs. 51 and 52. Said face rolls K and H may also be operated against the peripheral face of the work-piece, either together in unison, or independent of each other. In this case, said face rolls K and H are shown to be operated together in unison against the peripheral face of the work-piece; that is, each roll moves the same radial distance as the other. These face rolls K and H, in this case, are forced against the peripheral face of the work-piece at diametrically opposite points while the work-piece is rotating and thereby compress and enlarge the sectional volume of the metal in the rim portion of new or worn wheels while the same are rolled to smaller diameter, and thus form the rim of the wheel to smaller diameter. Fig. 28 shows said new or worn car wheel shown at $F^1$ in Fig. 27, so rolled or formed to the form shown at $F^1$ in Fig. 27, so rolled or formed to the form shown at $F^2$, and shows the work-piece or wheel and the operating parts in their positions at the end of the rolling or operating process.

Fig. 29 shows the forming-die, for instance $W^1$, supported by the edging and die-supporting roll, for instance $J^{61}$, and by the die-supporting roll, for instance $G^{14}$, all being in the positions they occupy at the commencement of the operating process. In the position shown, the roll $G^{14}$ with its die-supporting part $g^{139}$ supporting the forming-die in both radial and lateral directions, and with its edging or supporting portion $g^{137}$ is against or in contact with the face finishing roll H as shown. In some cases the supporting portion $g^{137}$ of said roll $G^{14}$ also serves as an edging roll portion, as for instance shown by the roll $G^{61}$, Fig. 5. The face rolls H and K may be moved at right angles to the axis of a supported work-piece during the operating process, as may be desired, or they may be retained at any desired radial distance or distances from the axis of the supported work-piece, such as the case may require, or both face rolls H and K may be moved together or in unison, as hereinbefore described and as more fully described in my said original application. In the position shown in Fig. 29 said roll $J^{61}$ with its die-supporting portion $j^{40}$ is supporting the forming-die in both radial and lateral directions and with its edging roll portion $j^{29}$ is against or in contact with the face rolling roll K, as shown. Said edging and die-supporting roll may also be formed entirely different and may also be formed to serve other purposes than the one shown in Fig. 29. During the operating process against a work-piece, said face roll K, will operate upon the peripheral face of the work-piece continually and as a work-piece, for instance, increases in diameter, said face roll moves with the enlargement of said diameter, as for instance indicated by the distance $x^6$ away from the edge of forming-die $W^1$ until the desired diameter of the work-piece has been reached, when said movement of face roll K will be automatically stopped and the roll K retained, and during said movement of said face roll K away from the edge of the forming-die $W^1$, the edging roll part $j^{29}$ of said roll $J^{61}$ will operate against or in contact with the side or edge of the marginal or rim portion of the work-piece, as for instance shown by roll $J^{61}$ in Fig. 17. In said Fig. 29, the edging roll part $j^{29}$ of roll $J^{61}$ may be driven by its shaft J, while the die-supporting portion $j^{40}$ of said roll $J^{61}$ may be rotatably fixed and permitted to turn loose, for instance on a journal provided on said shaft J, such loose roll portions are shown and described in my said original application for said edging and web rolling rolls.

In Fig. 29 is also illustrated, for instance, the operation of piercing or penetrating the side of the work-piece next to the forming-die before or during the operation with the rolls; that is, when the work-piece is in proper position, as shown by the portion of the work-piece F in Fig. 29, the piercer or center, for instance $E^9$, is forced into the work-piece, for instance, the distance $x^7$, as shown by the dotted lines, while the forming-die $W^1$ and the rolls $G^{14}$, $J^{61}$, H and K are retained in the position shown.

In Fig. 29 the forming-die $W^1$ is formed at the peripheral portion of its operating or forming-side with the inclined peripheral face $w^3$ which is adapted to form the inner peripheral face of the marginal or rim portion of the side of the work-piece next to the forming-die to the inclined form $f^{18}$, shown for instance in Fig. 43. Said face $w^3$ is the same as and for the purpose hereinbefore described with reference to the Figs. 49, 50, 52 and 53.

In Fig. 30 the die-supporting portions of the rolls $J^{66}$ and $G^{48}$ are formed with stepped portions, each having its peripheral face formed straight, or approximately so, thereby forming shoulders which also support the forming-die $W^{11}$ radially in opposite directions as shown.

In Fig. 31 is shown, at $F^2$, a formed gear wheel blank or a disk wheel, or a center such as used for instance in some tired car wheels; the process for rolling or forming the same being similar to the process illustrated for instance in Fig. 1 for forming the car wheel therein shown; that is, the rolling and forming is performed with the use of only the forming-die $W^1$, rolls $J^{60}$, $J^{61}$, the roll K having its peripheral rolling face $K^3$ formed as shown, and the supporting heads, M, $M^{50}$ and axles E, E with their respective piercers or centers, for instance $E^1$, $E^9$ as shown. The rim portion is similarly rolled or formed as per illustration Fig. 53, and as hereinbefore fully described.

Fig. 43 shows a diametral section of a finished dished car wheel embodying my invention, taken on line 43—43, Fig. 45, the wheel being similar to the car wheel shown at $F^2$ in Fig. 21 and other figures and showing the inner peripheral face $f^{18}$ of the rim of the wheel at one side thereof formed with the forming-die portion $w^3$ by the action of the roll portions $j^{29}$, $j^{29}$ to said sufficiently inclined form, for instance $f^{18}$, as illustrated in Figs. 20, 21, 49 and 50. The inner peripheral face $f^{20}$ of the rim of the car wheel at the other side thereof has been first rolled by the roll, for instance, $J^1$, to the form shown in Fig. 20 and has then been rolled by the roll $G^1$ during the finishing process illustrated in Figs. 21 and 50 to the finished form, for instance $f^{20}$, as illustrated in Figs. 21 and 50. The car wheels in Figs. 43 and 44 are each shown with the hub bored.

Fig. 44 shows both said inner peripheral face rolled or formed to the forms $f^{20}$, $f^{20}$ as shown.

By such forming processes or steps, as for instance herein described for completely forming dished car wheels or other similar shaped articles embodying my invention, including said piercing or centering or penetrating of the work-piece with my said preferred apparatus or mill, or with any other mill producing the same result, the blank or work-piece may be pierced or centered or penetrated and completely formed in the same apparatus or mill with one heat to, for instance, the completely formed dished car wheel $F^2$ shown for instance in Figs. 42, 43 or 44, in which figures the wheel is shown with its hub bored. When the car wheel is so completely formed the flat end faces of the hub extensions or flanges 7, 7 are faced and the hub may be bored to proper size as shown at 6, Figs. 58 and 59.

The advantages of my invention are many and will be appreciated by those skilled in the art. Some of said advantages are for instance:—

The production of a dished car wheel embodying my invention having its central or hub and web portion including the inner edge, or the inner peripheral face or faces of its rim or marginal portion die and roll forged and its rim or marginal portion with the exception of the inner peripheral edge or inner peripheral face at the side next to the forming-die roll-forged and having the metal in the flange, tread and whole rim portion worked to greater density or refinement than the metal in the central or hub and web portions, with the greatest degree of density in the metal of the tread, flange and root of the flange where the strength of the wheel and its resistance to wear is mostly needed, which gives to said parts the greatest possible strength and most efficient wearing surface, which results in a car wheel much stronger and of longer actual life or service than has heretofore been produced. A dished car wheel or other circular object thus formed results also in an enormous saving in the cost of operations during the manufacture and the product is also cheapened and the output increased; or for instance, the production of a dished car wheel, as herein described, having an annular extension formed at one or both ends of the hub, whereby when turning or facing one or both ends of the hub to required length or gage, considerable time is saved, as well as tools, and gives the product an individuality by means of which it may be distinguished from other articles of the same class; or for instance, the production of a partly die and roll-forged and partly roll-forged dished car wheel, free or substantially free from initial or inherent stresses or strains; or, for instance, the production of a partly die and roll-forged and partly roll-forged dished car wheel having the metal therein worked to varied density in circular regions; or for instance, the production of a partly die and roll-forged and partly roll-forged dished car wheel worked or formed smooth on all its surfaces and free from undesirable raised portions or fins; or for instance, the production of a completely forged dished car wheel being partly die and roll-forged and partly roll-forged and being formed integral and worked or formed smooth on all its surfaces all of which may be performed with one heat; or for instance, the production of a dished car wheel partly die and roll-forged and partly roll-forged with its hub punched or pierced or penetrated, all of which may be performed with one heat; or for instance, the production of a partly die and roll-forged and partly roll-forged dished wheel which had been formed to rudimentary form and then to finished form; or for instance, the production of a rudimentarily formed dished car wheel being partly die and roll-forged and partly roll-forged and having the rim or peripheral portion formed to rudimentary form, so that the metal in said rim portion has been condensed or compressed to uniform or to practically uniform density; or for instance, the production of a partly die and roll-forged and partly roll-forged dished car wheel having its hub, web and the inner peripheral face or faces of its rim formed by die and roll forging and the remaining portion of its rim, including its outer peripheral face, formed solely by rolling pressures and evidencing said rolling and forming of the dished car wheel throughout; or for instance, a dished wheel partly formed with a forming-die slidably supported on suitable supporting means, the actual forming side of or forming portion of the forming-die being shaped to conform to the form or shape of that portion of the dished car wheel or other body at one side thereof which reaches to a circle at the inner peripheral edge or inner peripheral face of the marginal or rim portion of the wheel or other body when the same is rolled and formed to its finish, that is, the side of the work-piece next to the forming-die is pressed against the forming-die and metal of the work-piece at the side thereof next to the forming-die is forced into the forming cavity or cavities of the forming-die inside of said circle by the action of a roll or rolls acting against the work-piece at the other side thereof, and, the metal worked by and between said die and roll or rolls is "die and roll-formed" or "die and roll-forged" because one side thereof is being "rolled" or "rolled to form" while the other side is being "die-formed" or "die-forged". By this means, all surfaces of the work-piece or wheel, with the exception of that portion of the work-piece or wheel at one side thereof inside of said circle, are acted upon directly by rolls, and the whole rim portion with the exception of the inner peripheral face of the rim portion next to the forming-die, is rolled direct by rolls, and as soon as the metal at the peripheral face of the work-piece reaches the peripheral rolling face of the face roll K (see for instance Figs. 16 and 17), it will be rolled or worked continually until the work-piece or wheel has been rolled and formed to a desired diameter with the outer peripheral face thereof rolled for instance to the beaked or rudimentary form as for instance shown in Fig. 17. When thus rolled, the finishing roll H operates against the peripheral face of the work-piece or wheel, whereby the metal in the whole rim portion of the work-piece or wheel is compressed or worked to its maximum and uniform density or approximately so; or for instance, in forming, for instance, such articles as dished car wheels embodying my invention, the metal in the flange, tread and whole rim portion of the article may be worked to maximum density where the strength of the wheel is mostly needed, thereby giving to said parts the greatest possible strength and most efficient wearing surface, thus enormously reducing the cost of operation in the manufacture or the making of dished car wheels or other circular articles, cheapening the product and increasing the output; or for instance, the forming of the inner peripheral faces of the marginal or rim portion of a work-piece or wheel herein described sufficiently conical, or sufficiently inclined, as and for the purpose hereinbefore described with reference, for instance to Figs. 49, 50, 52 and 53; and then rolling the metal, or part of the metal forming the so sufficiently conically rolled inner peripheral face of said marginal or rim portion of the work-piece or wheel at one side thereof into another portion of the work-piece or wheel, as and for the purpose hereinbefore described and diagrammatically illustrated in Figs. 49 and 50. Other advantages are:—for instance, the rolling of the total peripheral face of the work-piece or wheel herein described, first to beaked or rudimentary form, as and for the purpose described with reference, for instance, to Figs. 18, 54, 55, 56, 57, 49 and 50 and then rolling the so beaked rudimentarily formed peripheral face to desired finished form, as and for the purpose hereinbefore described, for instance, with reference to Figs. 54, 55, 56 and 57 and diagrammatically illustrated in Figs. 49 and 50; or for instance, dished car wheels or other circular dished articles may be formed perfectly true, smooth and to balance and the desired gage or gages, and when the tread and flange or peripheral face of the car wheel or other article being rolled reaches its desired finished diameter, said finished diameter will automatically be retained during any further rolling or operating against the car wheel or other article, or for instance, the use of the tread or face roll K having its peripheral or rolling face formed as and for the purpose described with reference to the Figs. 17, 54, 55, 56, 57, 49, 50 or Figs. 52 and 53 and having its lateral thickness or width the same as is the lateral thickness or width which the outer or rim portion of the car wheel or other article is to have when finished and, the use of such edging and web rolling roll, formed for instance as $J^1$, $J^{55}$ or $J^{69}$ &c., and the edging and die supporting roll, formed for instance as $J^{61}$, $J^{66}$ or $J^{74}$, &c., being formed as and for the purpose herein described, for instance with reference to the Figs. 49, 50, 52 and 53, &c., and as, for instance, shown in the Figs. 12, 23, 30, 31, or 26 &c., whereby with said roll K and with said edging and web rolling roll, said edging and die-supporting roll, formed as for instance herein shown and as and for the purpose herein described, the metal in the peripheral face and in the whole rim portion of a dished car wheel or other article embodying my invention, is also worked simultaneously with the forming-die and said three rolls formed for instance as herein shown and whereby, the metal in the peripheral face and the whole rim portion of a car wheel or other article embodying my invention, is also condensed uniformly to its maximum, or practically so, thus giving to said metal in said peripheral face and rim portion its due maximum and uniform strength and its due maximum and uniform resistance to wear and thereby, when the work-piece or wheel is finished by my finishing process, said peripheral face and the whole rim portion is also formed smooth on all its surfaces to the desired forms or shapes without leaving a raised circular portion or fin which would have to be removed afterward by turning, or other costly means; or for instance, my novel forming-die herein shown and described in some of its various forms is slidably supported on the piercer or center of, for instance, the supporting-head $M^{50}$ and rotatable with said piercer or center. Other advantages of my invention will appear from the matter hereinbefore described.

Wherein the specification and claims the words "ingot, bloom or blank" are used, it is understood to mean the work-piece to be operated upon, and the word "work-piece" is used herein in a broad sense and it is intended to include an ingot, bloom, blank, car wheel or any other unfinished or completely finished circular, or approximately circular object adapted to be rolled or formed, reworked or re-formed, either to entirely change its shape, or only partly change its shape or outline, or to change its dimensions in whole or in part, as desired. In other words "work-piece" means any circular, or approximately circular, object to be operated upon.

Where in the claims reference is made to a car wheel or similar article, &c., or any portion of a car wheel, or to the metal in the car wheel or any portion thereof, or matter of like import, it is intended to refer to a car wheel before it is put in service; it being, of course, understood that after a car wheel is applied to a car and supports the weight of the car body, it is subjected to strains.

Where in the specification and claims the words "sufficiently conical" or "sufficiently inclined" are used with reference to the said inner rolling or operating portion of the web reducing roll part $j^{28}$ of said edging and web rolling roll, for instance $J^1$, $J^{55}$ or $J^{69}$, &c., and to the inclined peripheral portion, for instance $w^3$ of the forming-die, for instance $W^6$ in Fig. 10 or 11, &c., or with reference to the inner peripheral face or faces of the marginal or rim portion of the workpiece or wheel or other object, it is intended to mean the inclination of said inner rolling or operating portion of said web reducing roll part $j^{28}$ and the inclination of the peripheral portion, for instance $w^3$ of the forming-die, for instance $W^6$ in Fig. 10, being formed, &c., so as to cause the metal in said rim portion, during the operating process, to flow in the proper directions to assure compression of the metal in said rim portion to uniform or to practically uniform density, as distinctly illustrated in Figs. 49, 52 and 53, and as hereinbefore fully described with reference to said Figs. 49, 52 and 53. The reference characters 4 and 5, in Figs. 58 and 59, designate the web and hub portions or the central portion of the wheel or other article, which may also be termed the body portion of the wheel or other article.

The foregoing description clearly sets forth various piercing or penetrating or centering and rolling, forming, or forging processes or steps and operations, which I prefer to employ for piercing or penetrating and completely rolling and forming or forging, or working or re-working or re-forming properly heated ingots, blooms, blanks or other work-pieces into completely finished formed dished car wheels or other circular dished bodies embodying my invention, in the same apparatus or mill.

The method of and apparatus or mill I prefer to employ for producing dished car wheels or other circular dished articles embodying my invention forms no part of this invention, this being claimed in my said application filed October 11, 1917, Serial No. 195,922, and in my said applications having the hereinbefore mentioned serial numbers and filing dates.

The foregoing description and accompanying drawings further fully set forth my invention, together with portions of an apparatus or mill for manufacturing the same, and also illustrate and describe modifications in the arrangement and construction of said portions. It is to be understood, however, that many modifications and changes in the construction and arrangement of the parts and also in the steps and operations may still be made without departing from my invention, as defined in the claims.

My said novel devices or means herein described, may be operated in many ways different from those herein described and still be within the scope of my invention, and it is to be understood that I do not desire to limit myself to the operations of said devices or means as herein described, as such are only a few examples for the purpose of illustrating the manner or way of operating the same in forming dished car wheels or other circular dished articles embodying my invention as herein described.

Certain features of my invention herein described are not all claimed herein, but such features not herein claimed are covered by claims within applications filed by me and within patents issued to me and having the hereinbefore mentioned filing dates serial numbers and patent numbers.

It will be obvious to those skilled in the art that changes may be made without departing from my invention as defined in the claims.

I claim as my invention:—

1. A car-wheel or other circular article partly die and roll-forged and partly roll-forged and having a dished central portion and a rim portion formed integral with said dished central portion, one side of said central portion and the adjacent inner peripheral face of the rim being die-formed and the remaining surfaces of said car-wheel or other article being rolled to form, said central portion being formed or composed of metal having a given density or strength and said rim portion being formed or composed of metal of increased density or increased strength.

2. A car-wheel or other circular article partly die and roll-forged and partly roll-forged and having a dished central portion including a hub and web and a rim portion formed integral with said central portion, said central portion being formed or composed of metal having a given density or strength and said rim portion being formed or composed of metal of increased density or increased strength.

3. A car-wheel or other circular object partly die and roll-forged and partly roll-forged and having a dished central portion including a hub and web and a flanged rim formed integral with said central portion and whose central portion is formed or composed of metal having a given density or strength and whose flanged rim is formed of metal of uniform or practically uniform density and of increased density or increased strength.

4. A car-wheel or other circular article partly die and roll-forged and partly roll-forged and having a dished central portion including a hub and web and a rim or marginal portion formed integral with said central portion and whose central portion is formed or composed of metal of a given density or strength, whose rim or marginal portion except its tread or peripheral portion is formed or composed of metal of increased density or increased strength, and whose tread or peripheral portion is formed or composed of metal of still greater density or strength.

5. A car-wheel or other circular article having a dished central portion and a rim or marginal portion formed integral with said central portion and whose central portion is composed of metal of a given density or strength and formed by die and roll-forging, whose rim or marginal portion is formed partly by roll-forging and partly by die and roll-forging and with the exception of its tread or peripheral portion is composed of metal of increased density or strength and whose tread or peripheral portion is formed or composed of metal of still greater density or strength.

6. A car-wheel or other circular article having a dished central portion formed by die and roll-forging and a rim or marginal portion formed partly by roll-forging and partly by die and roll-forging.

7. A car-wheel or other circular article partly die and roll-forged and partly roll-forged and having a dished body portion and a marginal or rim portion formed integral with said body portion, whose body portion is composed of metal having a given density or strength and is formed by die and roll-forging and whose marginal or rim portion has one of its inner peripheral faces formed by die and roll-forging but otherwise solely by roll-forging, said marginal or rim portion being composed of metal of increased density or increased strength.

8. A car-wheel or other circular article partly die and roll-forged and partly roll-forged and having a dished body portion and a marginal or rim portion formed integral with said body portion, said body portion and one of the inner peripheral faces of the marginal or rim portion being formed by die and roll-forging and said marginal or rim portion being otherwise formed by roll-forging.

9. An integral car-wheel or other circular article having a dished central portion formed by die and roll-forging and a rim portion which with the exception of its inner peripheral face or one of its inner peripheral faces is formed solely by roll-forging, substantially as described.

10. As an article of manufacture, a car-wheel or other circular article formed integral and having a die and roll-forged dished web portion, a die and roll-forged hub portion, and a rim portion whose major portion including its peripheral face and its opposite sides is roll-forged.

11. As an article of manufacture, an integral car-wheel having a dished central portion and a rim, said dished central portion having been die and roll-forged free or substantially free from initial or inherent stresses or strains and said rim being formed partly by die and roll-forging and partly by roll-forging with its peripheral face roll-forged.

12. A car-wheel or other circular article formed integral and having a dished body portion and a rim or marginal portion, one side of said dished body portion and the adjoining inner peripheral face of said rim portion being die-formed and the remaining surfaces of the car-wheel or other article being rolled to form, the metal in said car-wheel or other article being of different density or strength in circular regions with the metal in the outermost region forming the tread or peripheral portion rolled to greatest density or strength.

13. An integral car-wheel or other circular article having a dished hub and web or central portion formed by die and roll-forging and a rim portion mainly roll-forged with its peripheral face and its opposite sides rolled to desired form.

14. A car-wheel or other circular article formed integral and having a die and roll-forged dished body portion and a partly die and roll-forged and partly roll-forged rim portion whose peripheral face is roll-forged, the whole having been so formed from an ingot, bloom, blank or other work-piece.

15. A car-wheel or other circular article formed integral and having a dished body portion and a rim or marginal portion, one side of said body and rim or marginal portions being die-formed and the remaining surfaces of the car-wheel or other article being rolled to form, said side having been die-formed during the rolling of said remaining surfaces.

16. A car-wheel or other circular article formed integral and having a die and roll-forged dished body portion and a partly die and roll-forged and partly roll-forged rim whose peripheral face is roll-forged and being formed or forged on all its surfaces and to true form.

17. A car-wheel or other circular article formed integral and having a dished body portion and a rim portion, one side of said dished body portion and the adjoining inner peripheral face of said rim portion being die-formed and the remaining surfaces of the car-wheel or other circular article including the outer peripheral face thereof being rolled to form, said side and said inner peripheral face having been die-formed during the rolling of said remaining surfaces, said car-wheel or other article being so formed on all its surfaces.

18. A car-wheel formed from an ingot, bloom, blank or other work-piece and having a die and roll-forged dished central portion including a web and a punched or pierced or partly punched or pierced hub, and a rim formed partly by die and roll-forging and partly by roll-forging with its peripheral face and its opposite sides or edges roll-forged.

19. A car-wheel completed while rotatably supported and having a punched or pierced or partly punched or pierced die and roll-forged hub, a die and roll-forged dished web, and a partly die and roll-forged and partly roll-forged rim whose peripheral face is roll-forged, all surfaces and angles of which are smoothly formed or forged and free from surplus metal which would have to be removed afterward.

20. A rudimentarily-formed car-wheel having a die and roll-forged dished body portion, and a mainly roll-forged rim whose outer periphery is rolled or forged to conical or approximately conical form so as to permit of its being rolled or formed to finish with a tread having a flange.

21. A rudimentarily-formed car-wheel having a dished body portion and a rim portion, one side of said dished body portion and the adjoining inner peripheral face of said rim portion being die-formed and the remaining surfaces of the car-wheel being rolled to form with the outer periphery of said rim portion rolled to conical or approximately conical form so as to permit of its being rolled or formed to finish with a tread having a flange.

22. A rudimentarily-formed dished car-wheel or other dished circular article having a partly die and roll-forged and partly roll-forged rim portion and a die and roll-forged dished central or hub and web portion formed integral with said rim portion, the inner peripheral face or faces of said rim portion being formed or forged sufficiently conical or inclined outwardly toward the periphery of the wheel to have caused the metal to flow in the proper direction and to have condensed or compressed the metal therein to uniform or practically uniform density, substantially as described.

23. A car-wheel or similar article formed integral and having its hub at one side thereof and the portion of the car-wheel or similar article surrounding said hub at the same side thereof die-formed, said surrounding portion being shaped to dished form and the car-wheel or similar article being otherwise rolled on all its surfaces.

24. A car-wheel or similar article having a hub, a dished web, and a rim, said hub and said dished web being die-formed at one side only and said car-wheel or similar article being otherwise rolled to form.

25. A car-wheel or similar article having a hub, a dished web, and a rim, the hub and the dished web at one side only of the car-wheel being die-formed and the remaining surfaces evidencing the rolling thereof.

26. A car-wheel having a punched or pierced or partly punched or pierced hub, a dished web, and a rim with a tread and a flange, all outer surfaces of the rim including the outer peripheral face thereof, the inner peripheral face thereof at one side of the car-wheel, and the hub and web at the same side of the car-wheel being rolled to form and evidencing the rolling thereof, the remaining surfaces of the car-wheel being die-formed during said roll-forging and evidencing the die-forming thereof.

27. A wheel having a die and roll-forged hub, a die and roll-forged dished web, and a partly die and roll-forged and partly roll-forged rim whose outer peripheral face is roll-forged, the dished web and the inner peripheral face of said rim at one side of the car-wheel evidencing the rolling thereof, said dished web and the inner peripheral face of said rim at the other side of the wheel evidencing the die-forging thereof.

28. A partly die and roll-forged and partly roll-forged wheel having a hub, a dished web and a rim and being rolled to form throughout one side thereof, at its peripheral face, and at the other side of its rim, said one side and said peripheral face and said other side of the rim of said wheel evidencing the rolling thereof.

29. A circular integral object formed with a rim and having the portion surrounded by said rim die and roll-forged to dished form, all exterior surfaces and one of the inner peripheral faces of said rim being rolled to form.

30. An integral car-wheel or similar circular article formed from a worn car-wheel or similar body and having a die and roll-forged dished central or body portion and a rim, whose major portion including its peripheral face is roll-forged, said car-wheel or similar article being rolled or formed or forged to smaller diameter than said worn car-wheel or similar circular body.

31. A car-wheel or similar circular body formed from an ingot, bloom, blank or other work-piece and having a rim and a dished central portion formed integral with said rim the exterior surfaces of said rim being rolled or formed to any desired shape and both inner peripheral faces of said rim being formed sufficiently conical or inclined outwardly toward the outer periphery of said rim substantially as and for the purpose described, one of said inner peripheral faces being die-formed and the other being rolled to form.

32. A car-wheel or other circular article having a die and roll-forged dished central portion and a partly die and roll-forged and partly roll-forged rim portion with its outer peripheral face and its opposite sides rolled or formed to any desired shape.

33. A car-wheel or other circular article having a rim and a dished central portion integral with said rim, a portion of one side of said car-wheel or other circular article being die-formed and the remaining portion of said side being rolled to form, the opposite side of said car-wheel or other circular article being rolled to form and the peripheral face of said rim being rolled to any desired shape.

34. A dished car wheel or other dished circular article formed integral and whose outer peripheral face has been first rolled to desired rudimentary form and then rolled to desired finished form.

35. A dished car wheel or other dished circular article having a rim or marginal portion which has been first rolled or formed to desired rudimentary form and then rolled or formed to desired finished form.

36. A dished car wheel or other dished similar article which has been formed at its entire opposite sides by rotatable or rotated pressure instrumentalities and at its outer peripheral face by a peripheral face roll while the operating parts of said instrumentalities and said roll have together completely surrounded said opposite sides and outer peripheral face in a plane passing radially and transversely through the work-piece or car wheel or similar article, thereby giving to the metal of said dished car wheel or similar dished article so formed the desired peculiar qualities specified.

37. A dished car wheel or other dished similar article which has been formed at its entire opposite sides by rotatable or rotated pressure instrumentalities and at its entire outer peripheral face by a peripheral face roll while the operating parts of said instrumentalities and said roll have together completely surrounded said opposite sides and outer peripheral face in a plane passing radially and transversely through the work-piece or car wheel or similar article, said outer peripheral face having been so formed during said forming operation to desired rudimentary form and having been then rolled to desired finished form, thereby giving to the metal of said dished car wheel or dished similar article so formed the desired different peculiar qualities specified.

38. A dished car wheel or other dished circular article which has been formed during rotation and having a hub and web or central portion and a rim or marginal portion and which hub and web or central portion and rim or marginal portion have been completely formed by rotatable or rotated side instrumentalities and a peripheral face-roll while the operating parts of said instrumentalities during the formation of said car wheel or other article have extended from the axis or from near the axis of the work-piece outwardly beyond the periphery of the work-piece or car wheel or other article and have operated against said central and rim portions and while said face roll has been operating between and in contact with said instrumentalities and against the peripheral face of the work-piece and while the pressure operating parts of said instrumentalities and the pressure operating part or parts of said face roll have together completely or entirely surrounded the work-piece or car wheel or other article in a plane passing radially and transversely through the work-piece or car wheel or other article, thereby giving to the metal of said car wheel or other article so formed the desired peculiar qualities specified.

39. A dished car wheel or other dished circular article which has been formed during rotation and having a hub and web or central portion and a rim or marginal portion and which hub and web or central portion and rim or marginal portion have been completely formed by rotatable or rotated side instrumentalities and a peripheral face roll while the operating parts of said instrumentalities during the formation of said car wheel or other article have extended from the axis or from near the axis of the work-piece outwardly beyond the periphery of the work-piece or car wheel or other article and have operated against said central and rim portions and while said face roll has been operating between and in contact with said instrumentalities and against the peripheral face of the work-piece and while the pressure operating parts of said instrumentalities and the pressure operating part or parts of said face roll have together completely or entirely surrounded the work-piece or car wheel or other article in a plane passing radially and transversely through the work-piece or car wheel or other article, said peripheral face having been so formed during said forming operation to desired rudimentary form and having been then rolled to desired finished form, thereby giving to the metal of the different portions of said car wheel or other article so formed the desired different peculiar qualities specified.

40. A dished car wheel or other dished similar article which has had its rim or marginal portion formed at its outer peripheral face and at its opposite sides including at least its inner peripheral face or one of its inner peripheral faces by rolling pressures which have together completely or entirely surrounded said outer peripheral face and said opposite sides including at least its said inner peripheral face or one of its said inner peripheral faces in a plane passing radially and transversely through said rim or marginal portion, thereby giving to the metal of said rim or marginal portion so formed the desired peculiar qualities specified.

41. A dished car wheel or other dished similar article which has had its rim or marginal portion formed at its outer peripheral face and at its opposite sides including at least its inner peripheral face or one of its inner peripheral faces by rolling pressures which have together completely or entirely surrounded said outer peripheral face and said opposite sides including at least its said inner peripheral face or one of its said inner peripheral faces in a plane passing radially and transversely through said rim or marginal portion, said rim or marginal portion having been so formed during said forming operation to desired rudimentary form and having been then rolled to desired finished form, thereby giving to the metal of said rim or marginal portion so formed the desired peculiar qualities specified.

42. A dished car wheel or other dished circular body having a rim or marginal portion and having been completely formed during rotation from a suitable work-piece by surrounding pressures applied thereto in a plane passing radially and laterally through the work-piece or car wheel or other body including rolling pressures applied in said plane to one of the opposite sides of said rim or marginal portion and to the outer peripheral face thereof, thereby giving to the metal of said dished car wheel or other dished body so formed the desired peculiar qualities specified.

43. A dished car-wheel or other dished circular body having a rim or marginal portion and having been completely formed during rotation from a suitable work-piece by surrounding pressures applied thereto in a plane passing radially and laterally through the work-piece or car-wheel or other body including rolling pressures applied in said plane to one of the opposite sides of said rim or marginal portion and to the outer peripheral face thereof, said rim or marginal portion having been so formed during said forming operation to desired rudimentary form and having been then rolled to desired finished form, thereby giving to the metal of said dished car-wheel or other dished body so formed the desired peculiar qualities specified.

In testimony whereof, I have hereunto set my hand.

LOUIS F. DIETER.

Witnesses:
JOHN A. L. BECKER,
MAUDE E. WESNER.